(12) United States Patent
Choi et al.

(10) Patent No.: US 11,455,083 B2
(45) Date of Patent: Sep. 27, 2022

(54) ELECTRONIC APPARATUS AND CONTROL METHOD THEREOF

(71) Applicant: SAMSUNG ELECTRONICS CO., LTD., Suwon-si (KR)

(72) Inventors: Junsik Choi, Suwon-si (KR); Seokho Ban, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/875,411

(22) Filed: May 15, 2020

(65) Prior Publication Data

US 2021/0318784 A1    Oct. 14, 2021

(30) Foreign Application Priority Data

Apr. 9, 2020    (KR) .................. 10-2020-0043561
Apr. 29, 2020   (KR) .................. 10-2020-0052795

(51) Int. Cl.
  *G06F 3/0484*    (2022.01)
  *F16M 11/10*    (2006.01)
  *G06F 1/16*    (2006.01)

(52) U.S. Cl.
  CPC .......... *G06F 3/0484* (2013.01); *F16M 11/105* (2013.01); *G06F 1/1622* (2013.01); *G06F 2200/1614* (2013.01)

(58) Field of Classification Search
  CPC ............... G06F 3/0484; G06F 1/1622; G06F 2200/1614; F16M 11/105
  See application file for complete search history.

(56) References Cited

U.S. PATENT DOCUMENTS 7,348,936 B2   3/2008  Lee et al.
9,467,732 B2  10/2016  Kim et al.
(Continued)

FOREIGN PATENT DOCUMENTS

CN    201465451 U    5/2010
CN    102890555 A    1/2013
(Continued)

OTHER PUBLICATIONS

Communication dated Nov. 16, 2020 by the European patent Office in European Application No. 20175038.7.
(Continued)

*Primary Examiner* — Amit Chatly
(74) *Attorney, Agent, or Firm* — Sughrue Mion, PLLC

(57) ABSTRACT

A control method of an electronic apparatus is provided. The control method includes: displaying, on a display of the electronic apparatus, a first user interface (UI) for setting a display mode, from among a horizontal mode and a vertical mode, for each of one or more sources providing images to the electronic apparatus; storing information on a display mode corresponding to a first source, based on receiving, through the first UI, a first user input for setting the display mode corresponding to the first source of the one or more sources; and controlling at least one of the display or a motor of the electronic apparatus so that the display is operated in one of the horizontal mode or the vertical mode according to the stored information on the display mode corresponding to the first source, based on receiving a second user input for providing an image through the first source.

19 Claims, 26 Drawing Sheets

(56) References Cited

U.S. PATENT DOCUMENTS

| | | | |
|---|---|---|---|
| 9,756,349 | B2 | 9/2017 | Perlman et al. |
| 9,927,873 | B2 | 3/2018 | Cruz-Hernandez et al. |
| 10,032,434 | B2* | 7/2018 | Yoon .................. H04N 21/4436 |
| 10,515,607 | B2 | 12/2019 | Yoon et al. |
| 2009/0083789 | A1* | 3/2009 | Quinney ................ G09G 5/003 |
| | | | 725/38 |
| 2011/0298982 | A1 | 12/2011 | Kobayashi |
| 2013/0024709 | A1 | 1/2013 | Park et al. |
| 2014/0125589 | A1 | 5/2014 | Kim et al. |
| 2014/0333671 | A1* | 11/2014 | Phang ..................... G06F 3/017 |
| | | | 345/659 |
| 2015/0195607 | A1 | 7/2015 | Kim et al. |
| 2016/0284059 | A1* | 9/2016 | Gonzalez Solis .. H04N 1/00289 |
| 2017/0155831 | A1* | 6/2017 | Jang ................... H04N 5/23296 |
| 2017/0193962 | A1 | 7/2017 | Yoon et al. |
| 2017/0195612 | A1* | 7/2017 | Yoon ................ H04N 21/43615 |
| 2017/0199715 | A1* | 7/2017 | Manchinasetti ........ G06F 3/048 |
| 2018/0146224 | A1 | 5/2018 | Park et al. |
| 2018/0301112 | A1 | 10/2018 | Yoon et al. |
| 2019/0050964 | A1 | 2/2019 | Jang et al. |

FOREIGN PATENT DOCUMENTS

| | | | | |
|---|---|---|---|---|
| CN | 103813209 | A | | 5/2014 |
| CN | 103901901 | A | | 7/2014 |
| CN | 105204804 | A | | 12/2015 |
| CN | 106445432 | A | | 2/2017 |
| EP | 3 190 786 | A2 | | 7/2017 |
| EP | 3 190 796 | A1 | | 7/2017 |
| EP | 3 444 798 | A1 | | 2/2019 |
| EP | 3444798 | A1 * | 2/2019 | ............. F16M 11/18 |
| JP | 2009-195445 | A | | 9/2009 |
| KR | 10-0471089 | B1 | | 3/2005 |
| KR | 10-0606744 | B1 | | 8/2006 |
| KR | 10-2007-0070858 | A | | 7/2007 |
| KR | 10-2008-0008012 | A | | 1/2008 |
| KR | 10-2009-0032229 | A | | 4/2009 |
| KR | 10-2011-0122557 | A | | 11/2011 |
| KR | 10-1214894 | B1 | | 12/2012 |
| KR | 10-1399665 | B1 | | 5/2014 |
| KR | 10-2914-0146488 | A | | 12/2014 |
| KR | 10-2017-0075448 | A | | 7/2017 |
| KR | 10-2017-0081985 | A | | 7/2017 |
| KR | 10-2018-0057473 | A | | 5/2018 |
| KR | 10-2019-0017614 | A | | 2/2019 |
| KR | 10-2020-0108760 | A | | 9/2020 |

OTHER PUBLICATIONS

Communication dated Dec. 2, 2020 by the State Intellectual Property Office of P.R. China in Chinese Patent Application No. 202010401429.7.

International Search Report (PCT/ISA/210) dated Dec. 30, 2020 by the International Searching Authority in International Patent Application No. PCT/KR2020/006457.

Written Opinion (PCT/ISA/237) dated Dec. 30, 2020 by the International Searching Authority in International Patent Application No. PCT/KR2020/006457.

Communication dated Jan. 13, 2021 by the Korean Intellectual Proerty Office in Korean Patent Application No. 10-2020-0052795.

Communication dated Feb. 26, 2021, issued by the National Intellectual Property Administration of P.R. China in Chinese Application No. 202010401429.7.

Communication dated Sep. 6, 2021 issued by the Korean Intellectual Property Office in Korean English Application No. 10-2021-0048065.

Communication dated Jun. 15, 2022 by the European Patent Office in European Patent Application No. 20175038.7.

* cited by examiner

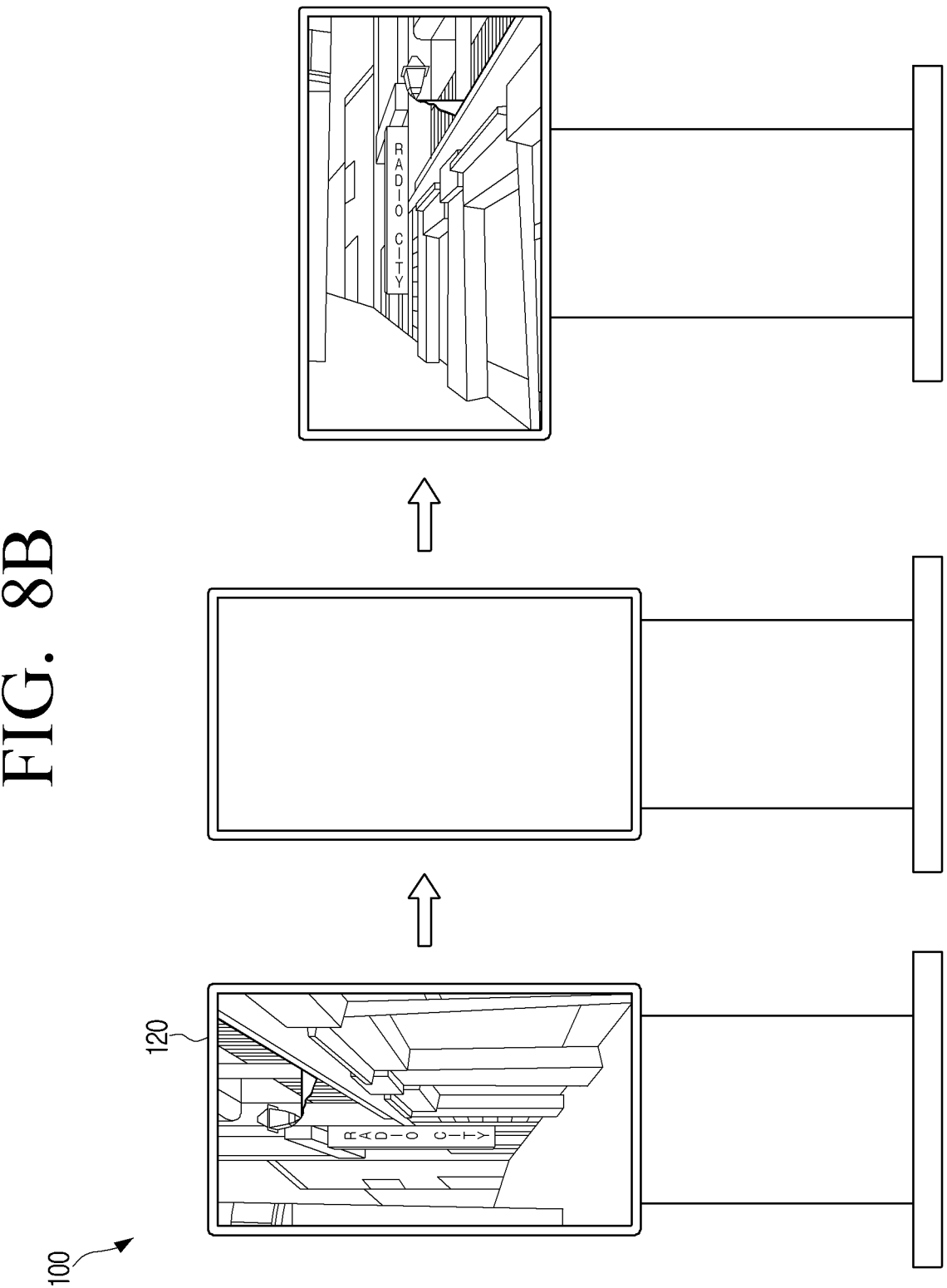

ELECTRONIC APPARATUS AND CONTROL METHOD THEREOF

CROSS-REFERENCE TO RELATED APPLICATIONS

This application is based on and claims priority under 35 U.S.C. § 119 to Korean Patent Application No. 10-2020-0043561, filed on Apr. 9, 2020, and Korean Patent Application No. 10-2020-0052795, filed on Apr. 29, 2020, in the Korean Intellectual Property Office, the disclosures of which are incorporated by reference herein in their entireties.

BACKGROUND

1. Field

The disclosure relates to an electronic apparatus and a control method thereof, and more particularly, to an electronic apparatus capable of rotating a display, and a control method thereof.

2. Description of Related Art

Recently, with the development of an electronic technology, various electronic apparatuses have been developed. In particular, recently, a rotatable display apparatus has been developed.

In the rotatable display apparatus of the related art, when a user command for rotation is input, a display disposed in a horizontal orientation may be rotated to a vertical orientation or a display disposed in a vertical orientation may be rotated to a horizontal orientation.

In the related art technologies, the display is rotated directly at a point in time desired by a user or the display is rotated only in some situations. For example, when a user input is received, the electronic apparatus may rotate the display according to the user input. In this case, as the user inputs a user command for rotating the display, the display rotates every time according to the user command, which is troublesome.

SUMMARY

Provided are an electronic apparatus capable of setting a display mode of a display for each source provided to the display of the electronic apparatus, and a control method thereof.

Additional aspects will be set forth in part in the description which follows and, in part, will be apparent from the description, or may be learned by practice of the presented embodiments.

In accordance with an aspect of the disclosure, an electronic apparatus includes: a display configured to be rotatable; a motor configured to rotate the display; a memory configured to store at least one instruction; and a processor configured to execute the at least one instruction to: control the display to display a first user interface (UI) for setting a display mode, from among a horizontal mode and a vertical mode, for each of one or more sources providing images to the electronic apparatus, store information on a display mode corresponding to a first source in the memory, based on receiving, through the first UI, a first user input for setting the display mode corresponding to the first source of the one or more sources, and control at least one of the display or the motor so that the display is operated in one of the horizontal mode or the vertical mode according to the information on the first display mode corresponding to the first source that is stored in the memory, based on receiving a second user input for providing an image through the first source.

The one or more sources include one or more external apparatuses connectable to the electronic apparatus, and the processor is further configured to control the display to display the first UI, based on a first connection to a first external apparatus of the one or more external apparatuses being performed.

The processor is further configured to control the display to further display information on a terminal connected to the first external apparatus and information on the first external apparatus on the first UI, based on the first connection to the first external apparatus being performed.

The processor is further configured to obtain information on the first source, and control the display to further display, on the first UI, a recommendation icon for recommending the display mode which corresponds to the first source, based on the obtained information.

The first UI displays information on the one or more sources and displays one or more first icons for setting display modes for the one or more sources, and the processor is further configured to control the display to display a second icon for changing the display mode for the first source, based on a first icon corresponding to the first source among the one or more first icons being selected, and store the information on the changed display mode corresponding to the first source in the memory, based on the first user input for setting the display mode corresponding to the first source being received through the second icon.

The one or more sources include one or more external apparatuses connectable to the electronic apparatus, the first source is a first external apparatus of the one or more external apparatuses, and the processor is further configured to control the display to further display a second UI for setting a display mode for each of one or more applications installed in the first external apparatus, and store information on a display mode corresponding to a first application in the memory, based on a third user input for setting the display mode corresponding to the first application of the one or more applications installed in the first external apparatus being received through the second UI.

The processor is further configured to control the at least one of the display or the motor so that the display is operated according to the information on the display mode corresponding to the first application that is stored in the memory, based on a fourth user input for displaying the first application being received while an image is provided from the first external apparatus.

The processor is further configured to identify whether the display mode corresponding to the first source and a current display mode are the same, based on the second user input for providing the image through the first source being received, control the motor to rotate the display, based on the display mode corresponding to the first source and the current display mode not being the same, and control the motor so that the display is not rotated, based on the display mode corresponding to the first source and the current display mode being the same.

The processor is further configured to control the display to display a third UI for inquiring whether to rotate the display, based on the display mode corresponding to the first source and the current display mode not being the same, and control the motor to rotate the display, based on a user input for rotating the display being received through the third UI.

The processor is further configured to control the display to display information on one or more sources displayed on a screen of the display, information on display modes in which the one or more sources are displayed, and an icon for setting the display mode for the one or more sources displayed on the screen, and control the display to display the first UI, based on the icon being selected.

In accordance with an aspect of the disclosure, a control method of an electronic apparatus includes: displaying, on a display of the electronic apparatus, a first user interface (UI) for setting a display mode, from among a horizontal mode and a vertical mode, for each of one or more sources providing images to the electronic apparatus; storing information on a display mode corresponding to a first source, based on receiving, through the first UI, a first user input for setting the display mode corresponding to the first source of the one or more sources; and controlling at least one of the display or a motor of the electronic apparatus so that the display is operated in one of the horizontal mode or the vertical mode according to the stored information on the display mode corresponding to the first source, based on receiving a second user input for providing an image through the first source.

The one or more sources include one or more external apparatuses connectable to the electronic apparatus, and the displaying further includes displaying the first UI, based on a first connection to a first external apparatus of the one or more external apparatuses being performed.

The displaying further includes displaying information on a terminal connected to the first external apparatus and information on the first external apparatus on the first UI, based on the first connection to the first external apparatus being performed.

The displaying further includes obtaining information on the first source; and displaying, on the first UI, a recommendation icon for recommending the display mode which corresponds to the first source, based on the obtained information.

The first UI displays information on the one or more sources and displays one or more first icons for setting display modes for the one or more sources, the displaying further includes displaying a second icon for changing the display mode for the first source, based on a first icon corresponding to the first source among the one or more first icons being selected, and the storing further includes storing the information on the display mode corresponding to the first source, based on the first user input for setting the display mode corresponding to the first source being received through the second icon.

The one or more sources include one or more external apparatuses connectable to the electronic apparatus, the first source is a first external apparatus of the one or more external apparatuses, displaying further includes displaying a second UI for setting a display mode for each of one or more applications installed in the first external apparatus, and the storing further includes storing information on a display mode corresponding to a first application, based on a third user input for setting the display mode corresponding to the first application of the one or more applications installed in the first external apparatus being received through the second UI.

The controlling further includes controlling the at least one of the display or the motor so that the display is operated according to the stored information on the display mode corresponding to the first application, based on a fourth user input for displaying the first application being received while an image is provided from the first external apparatus.

The controlling further includes identifying whether the display mode corresponding to the first source and a current display mode are the same, based on the second user input for providing the image through the first source being received; controlling the motor to rotate the display, based on the display mode corresponding to the first source and the current display mode not being the same; and controlling the motor so that the display is not rotated, based on the display mode corresponding to the first source and the current display mode being the same.

The controlling further includes displaying a third UI for inquiring whether to rotate the display, based on the display mode corresponding to the first source and the current display mode not being the same, and controlling the motor to rotate the display, based on a user input for rotating the display being received through the third UI.

The displaying further includes displaying information on one or more sources displayed on a screen of the display, information on display modes in which the one or more sources are displayed, and an icon for setting the display mode for the one or more sources displayed on the screen, and displaying the first UI, based on the icon being selected.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8A is a view illustrating a UI for setting a display mode in a case where the electronic apparatus according to an embodiment is turned off or turned on;

FIG. 8B is a view illustrating a method in which the display is operated according to a display mode in a case where the electronic apparatus according to an embodiment is turned off and then turned on;

DETAILED DESCRIPTION

Hereinafter, certain embodiments will be described in detail with reference to the accompanying drawings.

Figure 1A:
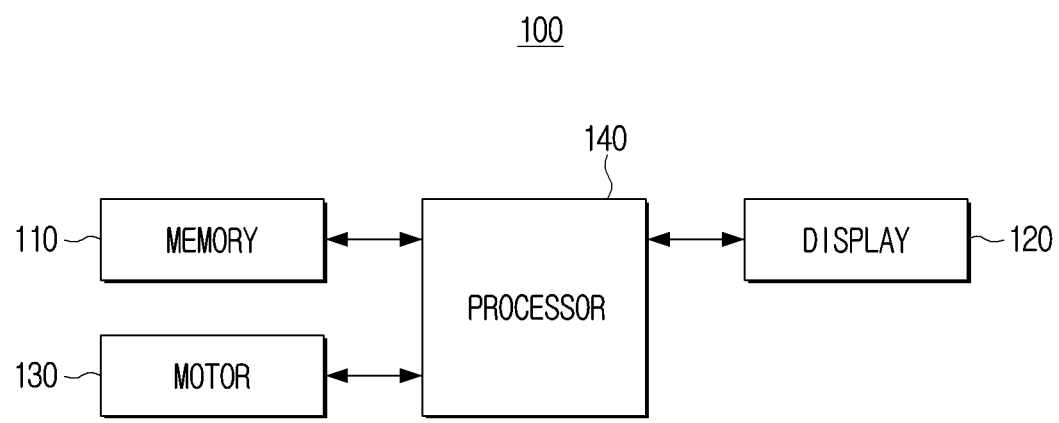
FIG. 1A is a block diagram illustrating a configuration of an electronic apparatus according to an embodiment.

FIG. 1A is a block diagram illustrating a configuration of an electronic apparatus according to an embodiment. An electronic apparatus 100 according to an embodiment may be implemented by various display apparatuses such as a television (TV), a smart TV, a monitor, an electronic frame, an electronic bulletin board, an electronic table, a laptop computer, a large format display (LFD), and the like.

Referring to FIG. 1A, the electronic apparatus 100 according to an embodiment may include a memory 110, a display 120, a motor 130, and a processor 140.

At least one command regarding the electronic apparatus 100 may be stored in the memory 110. In addition, an operating system (OS) for driving the electronic apparatus 100 may be stored in the memory 110. In addition, various software programs or applications for operating the electronic apparatus 100 according to various embodiments may also be stored in the memory 110. In addition, the memory 110 may include a semiconductor memory such as a flash memory or the like, or a magnetic storing medium such as a hard disk or the like.

Specifically, various software modules for operating the electronic apparatus 100 according to embodiments may be stored in the memory 110, and the processor 140 may run the various software modules stored in the memory 110 to control an operation of the electronic apparatus 100. That is, the memory 110 may be accessed by the processor 140, and readout, recording, correction, deletion, update, and the like, of data in the memory 110 may be performed by the processor 140.

Herein, the term "memory" may refer to the memory 110, a read only memory (ROM) in the processor 140, a random access memory (RAM), or a memory card (for example, a micro secure digital (SD) card or a memory stick) mounted in the electronic apparatus 100.

Particularly, in embodiments, when a user input for setting a display mode corresponding to each of one or more sources providing an image to the display 120 is received, information on the display mode corresponding to the source for which the user input is received may be stored in the memory 110. In addition, a content and the like received from an external apparatus such as a user terminal or a broadcast receiving apparatus may be stored in the memory 110. Furthermore, various information for achieving an embodiment may be stored in the memory 110, and the information stored in the memory 110 may be updated by reception of information from a server or the external apparatus or input of information by a user.

The display 120 may display various images. Here, the image is a concept including at least one of a still image or a moving image, and the display 120 may display various images such as a broadcasting content, a multimedia content, and the like. In addition, the display 120 may display various user interfaces (UIs) and icons.

The display 120 may be rotated according to drive of the motor 130. In this case, the display 120 may be rotated around a rotation center in a status where a front surface thereof is maintained in a predetermined direction. Here, the rotation center may be positioned at a geometric center of the display 120, but is not necessarily limited thereto and may also be positioned at another position of the display 120.

Figure 1B:
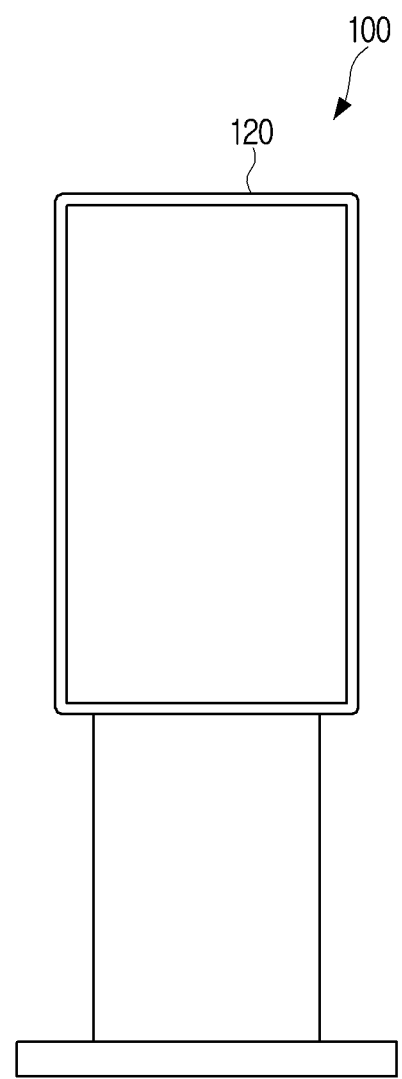
FIG. 1B is a view illustrating that a display according to an embodiment is operated in a vertical mode.
Figure 1C:
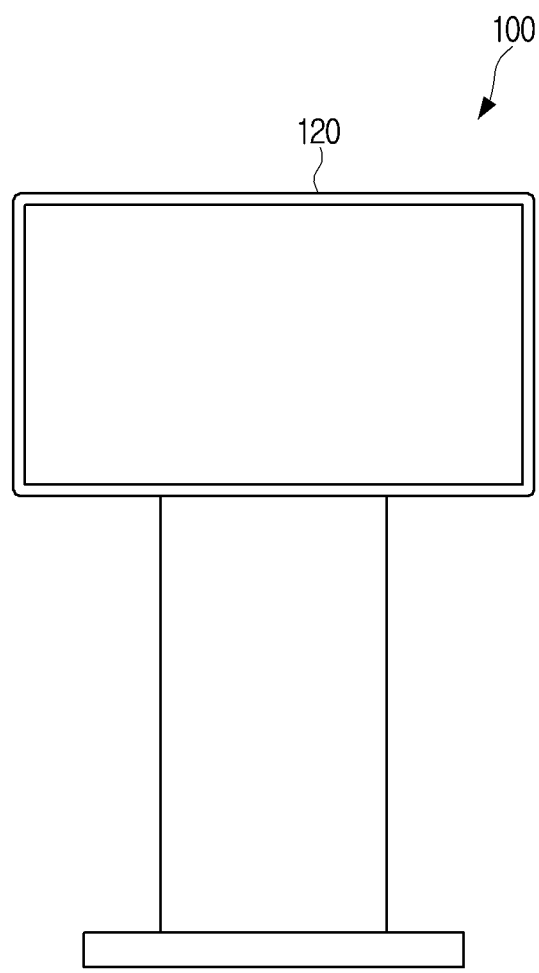
FIG. 1C is a view illustrating the display according to an embodiment operated in a vertical mode.

According to an embodiment, the display 120 may be operated in one display mode of a horizontal mode and a vertical mode. In an embodiment, the vertical mode may be a display mode in which a vertical ratio of the display 120 is greater than a horizontal ratio of the display 120, as illustrated in FIG. 1B. In this case, the display mode illustrated in FIG. 1B may be referred to as the vertical mode. However, this is only an example, and the display mode illustrated in FIG. 1B may be referred to as a vertical direction attitude mode or a portrait mode. In addition, the horizontal mode may be a display mode in which a horizontal ratio of the display 120 is greater than a vertical ratio of the display 120, as illustrated in FIG. 1C. In this case, the display mode illustrated in FIG. 1C may be referred to as the horizontal mode. However, this is only an example, and the display mode illustrated in FIG. 1C may be referred to as a horizontal direction attitude mode or a landscape mode.

According to an embodiment, the processor 140 may control at least one of the display 120 or the motor 130 so that the display 120 is operated in one of the vertical mode of FIG. 1B or the horizontal mode of FIG. 1C according to a predetermined display mode.

In addition, such a display 120 may be implemented by various types of displays such as a liquid crystal display (LCD) panel, a light emitting diode (LED), an organic LED (OLED), a liquid crystal on silicon (LCoS), a digital light processing (DLP), and the like. In addition, a driving circuit, a backlight unit, and the like, that may be implemented in a form such as an a-si thin film transistor (TFT), a low temperature poly silicon (LTPS) TFT, an organic TFT (OTFT), and the like, may be included in the display 120.

In addition, the display 120 may be implemented by a touch screen by combining with a touch sensor.

The motor 130 may rotate the display 120. Specifically, the motor 130 may be connected to a gear (for example, a circular gear) coupled to the display 120, and may rotate the gear according to control of the processor 140 to rotate the display 120. Alternatively, the motor 130 may stop the rotation of the gear according to control of the processor 140 to stop the rotation of the display 120.

The motor 130 may be implemented by a step motor that may generate a torque. However, this is only an example, and the motor 130 may be implemented by various motors such as an alternating current (AC) motor, a direct current (DC) motor and the like.

The processor 140 controls a general operation of the electronic apparatus 100. The processor 140 may include one or more of a central processing unit (CPU), an application processor (AP), or a communication processor (CP). The processor 140 may be implemented in various manners. For example, the processor 140 may be implemented by at least one of an application specific integrated circuit (ASIC), an embedded processor, a microprocessor, a hardware control logic, a hardware finite state machine (FSM), or a digital signal processor (DSP). For example, in an embodiment, the processor 140 may include a CPU, a graphic processing unit (GPU), a main processing unit (MPU), and the like.

The processor 140 may drive an operating system or an application program to control hardware or software components connected to the processor 140, and may perform various types of data processing and calculation. In addition, the processor 140 may load and process commands or data received from at least one of the other components into a volatile memory, and store various data in a non-volatile memory.

In an embodiment, the processor 140 may control the display 120 to display a first UI for setting a display mode for each of one or more sources providing an image to the display 120. The electronic apparatus 100 according to an embodiment may set the display mode for the source providing the image to the display 120 on the basis of a user input through the first UI.

In an embodiment, the first UI may include information on one or more sources and icons for setting display modes for one or more sources. In addition, when a first icon corresponding to a first source among the icons for setting the display modes for one or more sources is selected, the processor 140 may control the display 120 to display a second icon for changing a display mode for the first source. In addition, when a first user input for setting a display mode corresponding to the first source is received through the second icon, the processor 140 may store information on the display mode corresponding to the first source in the memory 110 on the basis of the first user input.

In an embodiment, a display mode for a case where the electronic apparatus 100 is turned on or turned off may be set through the first UI. As an example, when a user input for turning off the electronic apparatus 100 is received, the processor 140 may control at least one of the display 120 or the motor 130 so that the display 120 is operated according to the display mode, which corresponds to the case where the electronic apparatus 100 is turned off, set through the first UI, and the electronic apparatus 100 may be turned off. A detail of setting the display mode for the case where the electronic apparatus 100 is turned on or turned off will be described later with reference to FIGS. 8A and 8B.

In an embodiment, display modes for screens provided from one or more external apparatuses connectable to the electronic apparatus 100 may be set through the first UI. In this case, in an embodiment, the processor 140 may control the display 120 to display the first UI when a first connection between the electronic apparatus and the external apparatus is performed.

In addition, when a first connection between a first external apparatus of one or more external apparatuses connectable to the electronic apparatus and the electronic apparatus is performed, the processor 140 may control the display 120 to further display information on a terminal connected to the first external apparatus and information on the first external apparatus on the first UI.

In an embodiment, the processor 140 may control the display 120 to further display a recommendation icon for recommending a display mode for each source on the first UI. In an embodiment, the processor 140 may obtain information on the source, and control the display 120 to further display a recommendation icon for recommending a display mode corresponding to the source on the basis of the obtained information on the first UI. In an embodiment, in a case where the source is the first external apparatus of the external apparatuses connectable to the electronic apparatus, the processor 140 may receive the information on the first external apparatus from the first external apparatus. In an embodiment, the information on the first external apparatus may include a type, a product name, a manufacturer of the first external apparatus, content viewing history information of a user that uses the first external apparatus, and the like. In addition, the processor 140 may identify a display mode corresponding to the first external apparatus on the basis of the received information on the first external apparatus. In addition, the processor 140 may control the display 120 to display a recommendation icon for recommending the identified display mode as a display mode for the first external apparatus on the first UI.

In an embodiment, in a case where applications are installed in the external apparatus connectable to the electronic apparatus 100, the processor 140 may control the display 120 to further display a second UI for setting a display mode for each of the applications installed in the external apparatus. In addition, when a third user input for setting a display mode corresponding to a first application of one or more applications installed in the first external apparatus is received through the second UI, the processor 140 may store information on the display mode corresponding to the first application in the memory 110.

In an embodiment, a case where the display mode for the first external apparatus is set to a horizontal mode and the display mode for the first application installed in the first external apparatus is set to a vertical mode may be assumed. In this case, when a user input for providing an image through the first external apparatus is received, the processor 140 may control at least one of the display 120 or the motor 130 so that the display 120 is operated in the horizontal mode according to information on the display mode corresponding to the first external apparatus stored in the memory 110. That is, when a user input for receiving an image provided through the first external apparatus is received while an existing display mode of the display 120 is the vertical mode, the processor 140 may rotate the display 120 by controlling the display 120 and the motor 130 so that the display 120 is operated in the horizontal mode. On the other hand, when a user input for receiving an image provided through the first external apparatus is received in a case where an existing display mode of the display 120 is the horizontal mode, the processor 140 may control the display 120 so that the display mode of the display 120 is maintained as it is. In addition, when a user input for displaying an image for the first application is received while the image provided from the first external apparatus is displayed in the horizontal mode, the processor 140 may control the display 120 and the motor 130 so that the display 120 is operated in the vertical mode according to information on the display mode corresponding to the first application.

That is, in an embodiment, when a second user input for displaying the first source is received, the processor 140 may identify whether or the display mode corresponding to the first source and a current display mode are the same as each other. In a case where the display mode corresponding to the first source and the current display mode are not the same, the processor 140 may control the display 120 and the motor 130 to rotate the display 120. On the other hand, in a case where the display mode corresponding to the first source and the current display mode are the same, the processor 140 may maintain the display mode of the display 120 as it is.

In an embodiment, in a case where the display 120 is rotated according to the display mode corresponding to the first source, the processor 140 may control the display 120 to display a third UI inquiring whether to rotate the display 120. Then, when a user input for rotating the display 120 is received through the third UI, the processor 140 may control the display 120 and the motor 130 so that the display 120 is rotated.

That is, in an embodiment, when it is identified that the display mode is changed according to a user input for displaying the first source, the display 120 may be rotated immediately, but is not limited thereto, and the display 120 may be operated according to the display mode corresponding to the first source only in a case where a rotation command of the user is received through the third UI.

In an embodiment, a display mode for a source corresponding to the image displayed on the display 120 may be set according to a history for the image displayed on the display 120. Specifically, the processor 140 may control the display 120 to display information on the history for the image displayed on the display 120. That is, the processor 140 may control the display 120 to display at least one of information on one or more sources displayed on the display 120, information on a time when one or more sources are displayed, or information on display modes in which one or more sources are displayed. In addition, the processor 140 may control the display 120 to further display an icon for setting a display mode for each of one or more sources. In addition, when the icon is selected, the processor 140 may control the display 120 to display a first UI for setting a display mode for a source corresponding to the icon.

Although a method of setting the display mode for each source through the first UI in the electronic apparatus 100 is described above, embodiments are not limited thereto. That is, the display mode for each source of the electronic apparatus 100 may be set through the external apparatus connectable to the electronic apparatus 100, and a detailed content therefor will be described later with reference to FIG. 16.

According to the diverse embodiments as described above, the electronic apparatus 100 sets the display mode of the display 120 for each source provided to the electronic apparatus 100, such that the display 120 may be operated according to the display mode corresponding to the source provided on a screen of the display 120.

Figure 2:
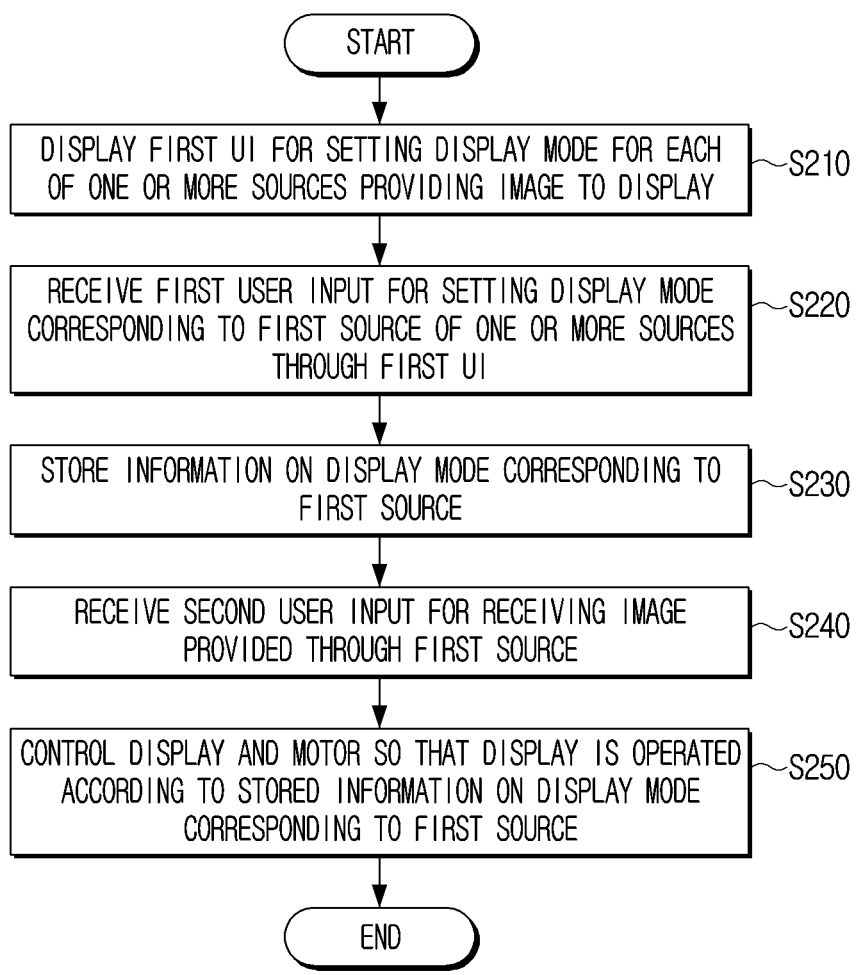
FIG. 2 is a flowchart of an operation of the electronic apparatus according to an embodiment.

FIG. 2 is a flowchart of an operation of the electronic apparatus according to an embodiment.

The electronic apparatus 100 may display a first UI for setting a display mode for each of one or more sources providing an image to the display (operation S210). In an embodiment, when a first connection between an external apparatus connectable to the electronic apparatus 100 and the electronic apparatus 100 is performed, the electronic apparatus 100 may display a first UI for setting a display mode for the external apparatus. As an example, when a new external apparatus is connected to a high definition multimedia interface (HDMI) No. 1 terminal provided in the electronic apparatus 100, the electronic apparatus 100 may display the first UI.

In addition, when a user input for setting the display mode for each source is received, the electronic apparatus 100 may display the first UI. In an embodiment, the user input for setting the display mode for each source may be a user input for displaying the first UI through an environment setting of the electronic apparatus 100. In addition, the electronic apparatus 100 may display the first UI by a user input for setting the display mode for each source according to a viewing history, and a detailed content therefor will be described later with reference to FIG. 9.

In an embodiment, the first UI is a UI for setting the display mode for one or more sources providing the image to the display according to an embodiment. The first UI may include information on one or more sources and one or more first icons for setting the display mode for one or more sources and a second icon for changing the display mode for one or more sources.

In an embodiment, when a first icon corresponding to a first source is selected among one or more first icons, the electronic apparatus 100 may display a second icon for changing a display mode for the first source on the first UI. While the first UI is displayed, the electronic apparatus 100 may receive a first user input for setting a display mode corresponding to the first source of one or more sources through the first UI (operation S220). In an embodiment, the first user input may include a user input for selecting an icon displayed on the first UI. However, the first user input is not limited thereto, and may further include a voice input of the user. That is, the first user input may include a user input for inputting an icon displayed on the first UI through an external remote control apparatus connected to the electronic apparatus 100 and a user voice for selecting an icon displayed on the first UI through a speaker provided in the electronic apparatus 100 or a speaker provided in the external remote control apparatus.

Then, the electronic apparatus 100 may store information on the display mode corresponding to the first source on the basis of the first user input (operation S230). In an embodiment, when a first user input for setting the display mode corresponding to the first source to a horizontal mode is received, the electronic apparatus 100 may match information on the first source and information on the horizontal mode to each other and store the matched information as the information on the display mode corresponding to the first source.

Then, when a second user input for receiving an image provided through the first source is received (operation S240), the electronic apparatus 100 may control the display 120 and the motor 130 so that the display 120 is operated according to the stored information on the display mode corresponding to the first source (operation S250). Specifically, in a case where a current display mode of the display 120 and the stored display mode corresponding to the first source are the same, the electronic apparatus 100 may maintain the display mode of the display 120. However, in a case where a current display mode of the display 120 and the stored display mode corresponding to the first source are not the same, the electronic apparatus 100 may rotate the display 120 by controlling the display 120 and the motor 130.

Figure 3:
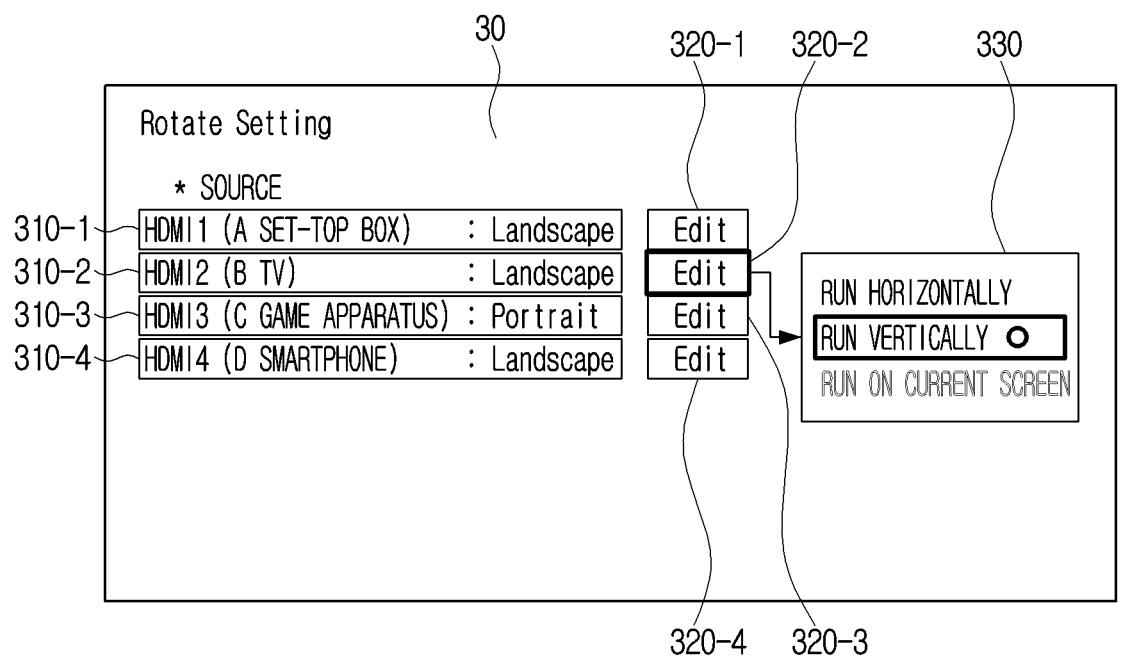
FIG. 3 is a view illustrating a UI for setting display modes for images provided from external apparatuses connectable to the electronic apparatus according to an embodiment.

FIG. 3 is a view illustrating a UI for setting display modes for images provided from external apparatuses connectable to the electronic apparatus according to an embodiment.

Referring to FIG. 3, the electronic apparatus 100 may display a UI 30 for setting a display mode for each of one or more external apparatuses connectable to the electronic apparatus 100, on the display. That is, the user may set the display mode for each of the external apparatuses connectable to the electronic apparatus 100 through the UI 30 illustrated in FIG. 3.

In an embodiment, the UI 30 for setting the display mode for each of the external apparatuses may include information 310-1 to 310-4 on one or more sources and one or more first icons for setting display modes for one or more sources. The first icons may include icons 320-1, 320-2, 320-3, and 320-4. Specifically, the UI 30 may include information 310-1 on an A set-top box connected to an HDMI No. 1 terminal and an icon 320-1 for setting a display mode for the A set-top box. Further, the information 310-1 for the A set-top box may include information on a display mode (landscape mode) currently set in the A set-top box. In addition, the UI 30 may include information 310-2 on a B TV connected to an HDMI No. 2 terminal and an icon 320-2 for setting a display mode for the B TV. The UI 30 may include information 310-3 about a C game apparatus connected to an HDMI No. 3 terminal and an icon 320-3 for setting a display mode for the C game apparatus. The UI 30 may include information 310-4 about a D smartphone connected to an HDMI No. 4 terminal and an icon 320-4 for setting a display mode for the D smartphone.

In an embodiment, when the icon 320-2 among the first icons for setting the display mode for the B TV is selected, a second icon 330 for changing the display mode for the B TV may be further displayed on the UI 30. In an embodiment, the second icon 330 may include icons for 'run horizontally', 'run vertically', and 'run on a current screen'.

In addition, when a user input for setting the display mode for the B TV is received through the second icon 330, the electronic apparatus 100 may store information on the display mode for the B TV in the memory 110 on the basis of the user input. Specifically, when the icon 'run vertically' for vertical execution is selected in the second icon 330, the electronic apparatus 100 may store information in which information on the B TV and information on a vertical mode are matched to each other, as the information on the display mode corresponding to the B TV in the memory 110. In a case where the icon for 'run on a current screen' is selected in the second icon 330, the electronic apparatus 100 may store information in which information on a current display mode of the display 120 is matched to information on the B TV in the memory 110.

After the display mode for the B TV is set through the UI 30 of FIG. 3, when a user input for displaying an image provided from the B TV on the display 120 is received, the electronic apparatus 100 may control at least one of the display 120 or the motor 130 so that the display 120 is operated on the basis of the information on the display mode for the B TV stored in the memory. Although FIG. 3 illustrates the external apparatus connected to the electronic apparatus through the HDMI terminal in the UI 30, an embodiment is not limited thereto. That is, the external apparatus may be connected to the electronic apparatus 100 through a mobile high-definition link (MHL), a universal serial bus (USB), a display port (DP), a thunderbolt, a video graphics array (VGA) port, an RGB port, a D-subminiature (D-SUB), or a digital visual interface (DVI) or may be connected to the electronic apparatus 100 in a wireless manner through a communication interface to be described later.

In an embodiment, the UI 30 of FIG. 3 may be displayed on the display 120 of the electronic apparatus 100, but is not limited thereto. That is, the display mode may be set for each of one or more external apparatuses connectable to the electronic apparatus 100 through the UI 30 in the external apparatus connected to the electronic apparatus. In this case, an icon that cannot be selected among icons included in the second icon 330 may be blurredly displayed. That is, in a case where the UI 30 is displayed on the external apparatus, a current screen status of the electronic apparatus 100 cannot be identified, and the icon for 'run on a current screen' included in the second icon 330 of FIG. 3 may thus be blurredly displayed.

In an embodiment, an 'automatic mode' icon may be further displayed in the second icon 330, and when the 'automatic mode' icon is selected, a display mode of the corresponding source may be set on the basis of a viewing history of the corresponding source. As an example, when a user input for setting a display mode for a first source to a horizontal mode is input a predetermined number of times or more (for example, five times), the electronic apparatus 100 may automatically set the display mode for the first source to the horizontal mode.

In a case where the display mode is set for each of the external apparatuses connectable to the electronic apparatus 100 through the embodiment described above and an image is provided from the set external apparatus, the electronic apparatus 100 may control the display 120 according to the set display mode.

Figure 4:
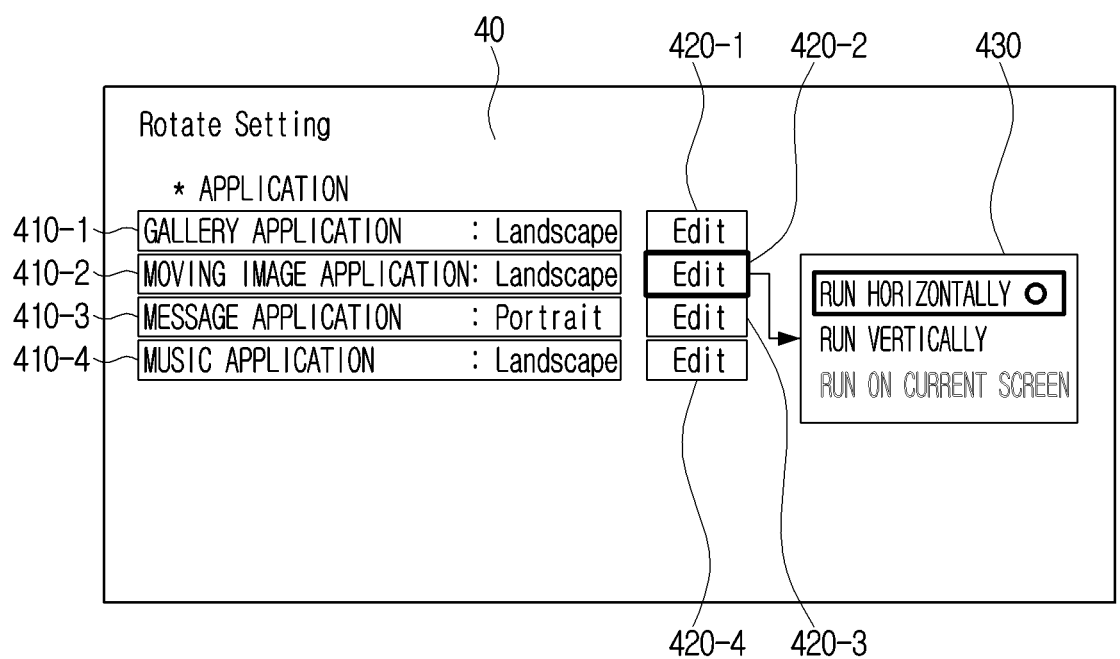
FIG. 4 is a view illustrating a UI for setting display modes for images provided from applications installed in the electronic apparatus according to an embodiment.

FIG. 4 is a view illustrating a UI for setting display modes for images provided from applications installed in the electronic apparatus according to an embodiment.

Referring to FIG. 4, the electronic apparatus 100 may display a UI 40 for setting a display mode for each of the applications installed in the electronic apparatus 100 on the display. That is, the user may set the display mode for each of the applications installed in the electronic apparatus 100 through the UI 40 illustrated in FIG. 4.

In an embodiment, the UI 40 for setting the display mode for each of the applications installed in the electronic apparatus 100 may include information 410-1, 410-2, 410-3, and 410-4 on one or more applications and one or more first icons for setting display modes for one or more applications. The first icons may include icons 420-1, 420-2, 420-3, and 420-4.

Specifically, the UI 40 may include information 410-1 on a gallery application installed in the electronic apparatus 100 and an icon 420-1 for setting a display mode for the gallery application. Further, the information 310-1 for the gallery application may include information on a display mode (landscape mode) currently set in the gallery application. In addition, the UI 40 may include information 410-2 on a moving image application and an icon 420-2 for setting a display mode for the moving image application. The UI 40 may include information 410-3 on a message application and an icon 420-3 for setting a display mode for the message application. The UI 40 may include information 410-4 on a music application and an icon 420-4 for setting a display mode for the music application.

In an embodiment, when the icon 420-2 is selected, a second icon 430 for changing the display mode for the moving image application may be further displayed on the UI 40.

In addition, when a user input for setting the display mode for the moving image application is received through the second icon 430, the electronic apparatus 100 may store information on the display mode for the moving image application in the memory 110 on the basis of the user input.

In an embodiment, the UI 40 of FIG. 4 may be displayed on the display 120 of the electronic apparatus 100, but is not limited thereto. That is, the display mode may be set for each of the applications installed in the electronic apparatus 100 through the UI 40 in the external apparatus connected to the electronic apparatus. In this case, an icon that cannot be selected among icons included in the second icon 430 may be blurredly displayed. That is, in a case where the UI 40 is displayed on the external apparatus, a current screen status of the electronic apparatus 100 cannot be identified, and an icon for 'run on a current screen' included in the second icon 430 of FIG. 4 may thus be blurredly displayed.

In a case where the display mode is set for each of the applications installed in the electronic apparatus 100 through the embodiment described above and the application for which the display mode is set is run, the electronic apparatus 100 may control the display 120 according to the set display mode.

Figure 5A:
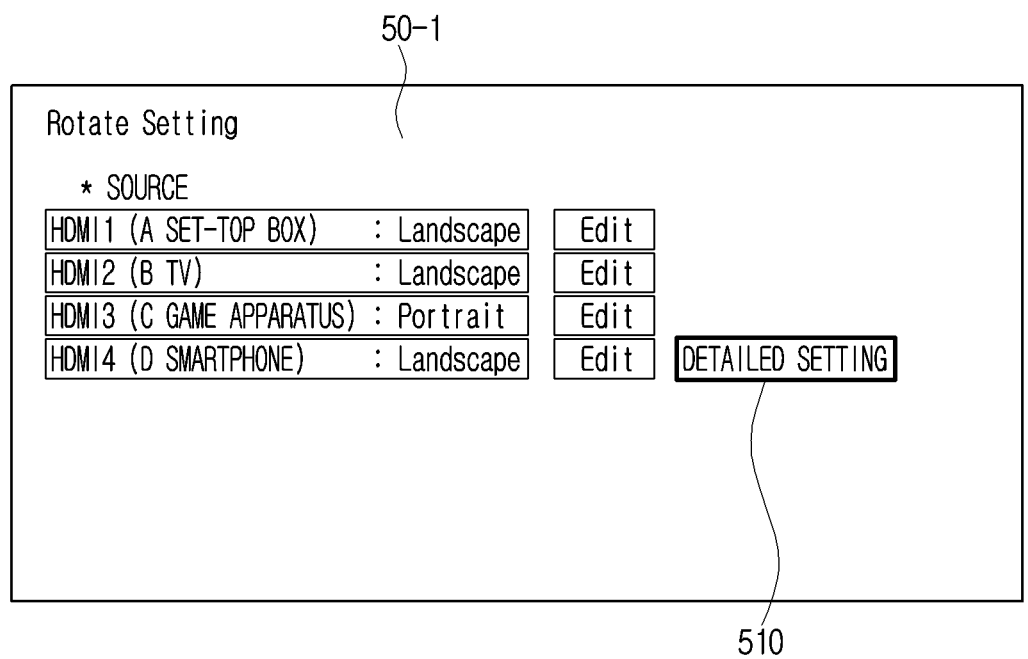
FIG. 5A is a view illustrating a UI for setting display modes for the external apparatuses connectable to the electronic apparatus according to an embodiment.
Figure 5B:
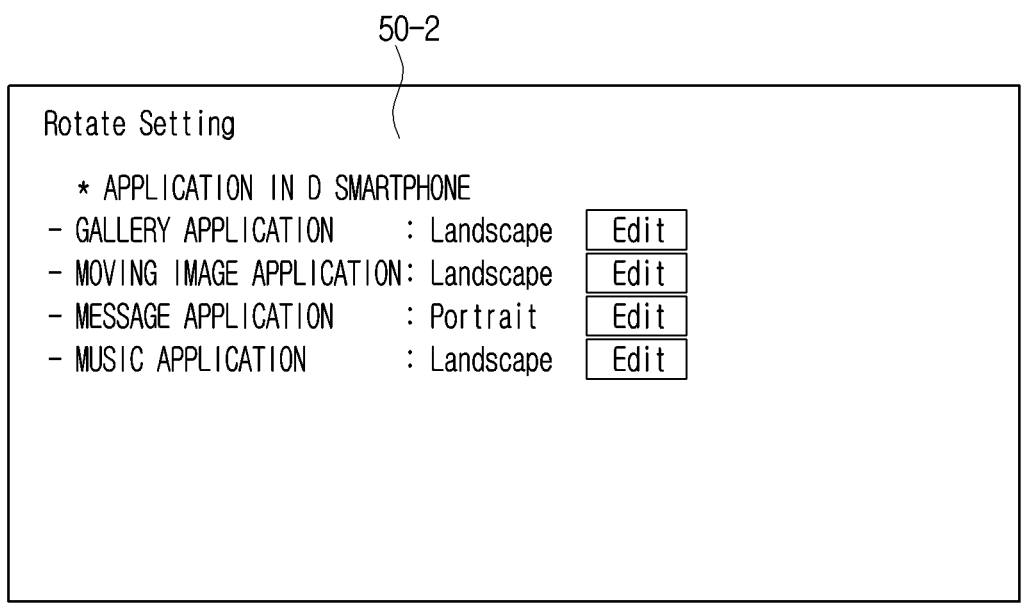
FIG. 5B is a view illustrating a UI for setting display modes for images provided from applications installed in the external apparatus connectable to the electronic apparatus according to an embodiment.

FIGS. 5A and 5B are views illustrating UIs for setting display modes for images provided from applications installed in the external apparatus connectable to the electronic apparatus according to an embodiment.

Referring to FIGS. 5A and 5B, the electronic apparatus 100 may display on UIs 50-1 and 50-2 for setting a display mode for each of the applications installed in the external apparatus connectable to the electronic apparatus 100 on the display. That is, the user may set display modes for one or more external apparatuses connectable to the electronic apparatus 100 through the UI 50-1 illustrated in FIG. 5A, and may set display modes for the applications installed in the external apparatus through the UI 50-2 illustrated in FIG. 5B.

In an embodiment, the electronic apparatus 100 may further display icons for setting display modes for the applications installed in the external apparatus on the UI 50-1 for setting display modes for one or more external apparatuses connectable to the electronic apparatus. Referring to FIG. 5A, the UI 50-1 further includes an icon 510 for setting display modes for applications installed on a D smartphone connected to an HDMI No. 4 terminal.

In addition, when the icon 510 for setting the display modes for the applications installed on the D smartphone is selected, the UI 50-2 for setting the display modes for the applications installed in the D smartphone may be displayed as illustrated FIG. 5B. In addition, a display mode may be set for each of the applications installed in the D smartphone through the UI 50-2 illustrated in FIG. 5B.

In an embodiment, as illustrated in FIGS. 5A and 5B, a case where a display mode corresponding to the D smartphone is set to a horizontal mode (landscape mode) and a message application installed in the D smartphone is set to a vertical mode (portrait mode) may be assumed. In this case, when a user input for receiving an image provided through the D smartphone is received, the electronic apparatus 100 may control at least one of the display 120 or the motor 130 so that the display 120 is operated in the horizontal mode. In a case where the message application installed in the D smartphone is run while an image provided from the D smartphone is displayed on the display 120 in the horizontal mode, the electronic apparatus 100 may control the display 120 and the motor 130 so that the display 120 is operated in the vertical mode.

Figure 6A:
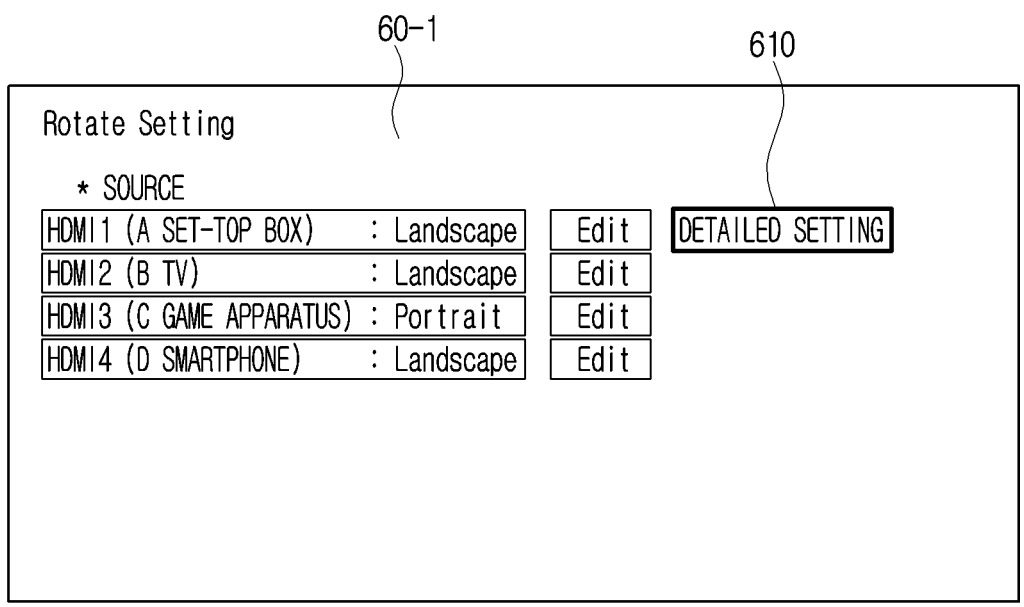
FIG. 6A is a view illustrating a UI for setting display modes for the external apparatuses connectable to the electronic apparatus according to an embodiment.
Figure 6B:
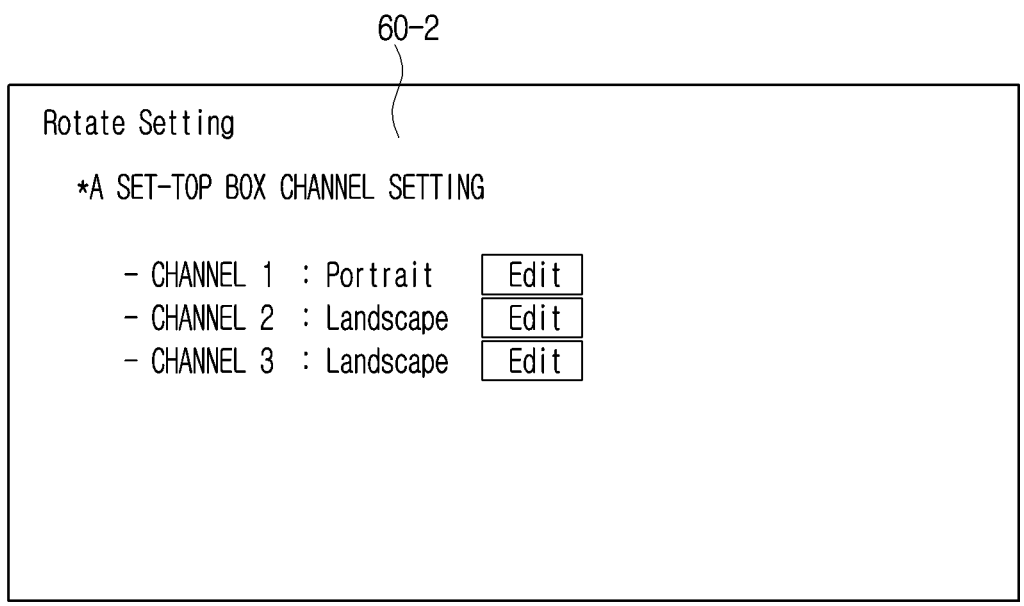
FIG. 6B is a view illustrating a UI for setting a display mode for a channel provided from the external apparatus connectable to the electronic apparatus according to an embodiment.

FIGS. 6A and 6B are views illustrating UIs for setting a display mode for each channel provided from the external apparatus connectable to the electronic apparatus according to an embodiment.

Referring to FIG. 6A, the electronic apparatus 100 may further display an icon 610 for setting a display mode for each channel provided from the external apparatus on a UI 60-1 for setting display modes for the external apparatuses connectable to the electronic apparatus 100. That is, in a case where images for a plurality of channels are provided from an A set-top box connected to an HDMI No. 1 terminal of FIG. 6A, the electronic apparatus 100 may further display an icon 610 for setting a display mode for each of the plurality of channels provided from the A set-top box together with an icon for setting a display mode for the HDMI No. 1 terminal.

In addition, when the icon 610 is selected, the electronic apparatus 100 may display a UI 60-2 for setting display modes for the plurality of channels provided from the A set-top box as illustrated in FIG. 6B. In addition, the display mode for each of the plurality of channels provided from the A set-top box may be set through the UI 60-2 of FIG. 6B.

In an embodiment, a case where a display mode for the A set-top box connected to the HDMI No. 1 terminal is set to a horizontal mode and a display mode for Channel 1 provided from the A set-top box is set to a vertical mode may be assumed. In this case, when a user input for receiving an image for the A set-top box through the HDMI No. 1 terminal is received, the electronic apparatus 100 may control at least one of the display 120 or the motor 130 so that the display 120 is operated in the horizontal mode. In addition, when a user input for displaying an image for Channel 1 is received while the image for the A set-top box is displayed on the display 120, the electronic apparatus 100 may control the display 120 and the motor 130 so that the display 120 is operated in the vertical mode.

Through the embodiment as described above, the display modes may be set according to characteristics and types of channels provided from the external apparatuses.

Figure 7A:
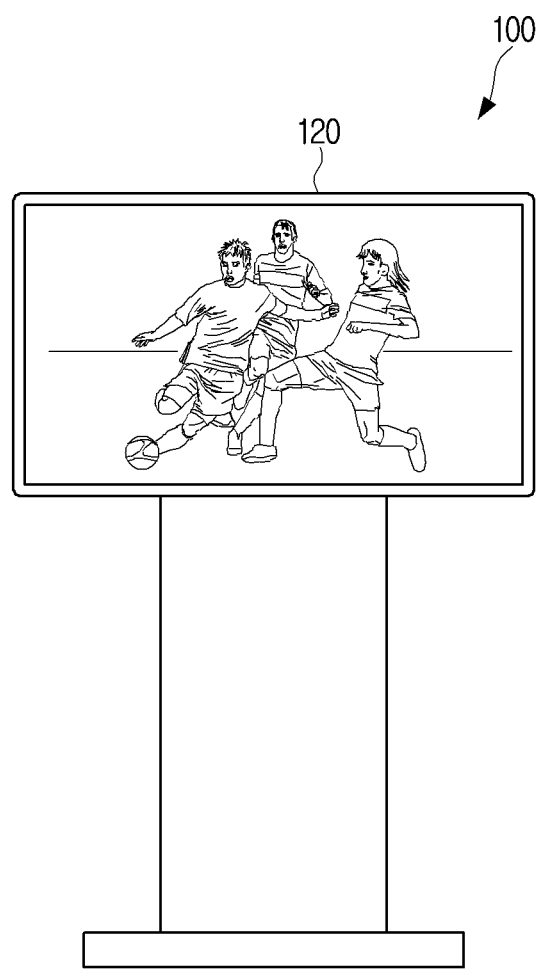
FIG. 7A is a view illustrating that an image provided in the electronic apparatus is provided in a horizontal mode.
Figure 7B:
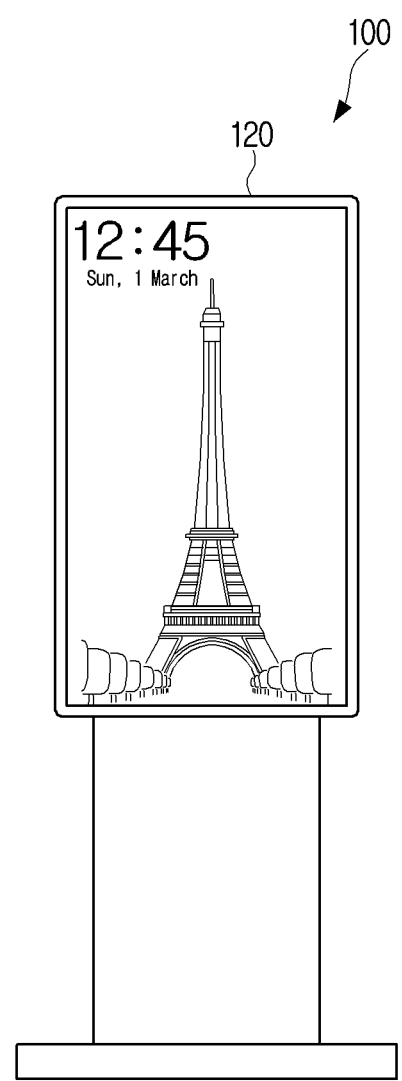
FIG. 7B is a view illustrating that a home screen provided from the external apparatus connectable to the electronic apparatus is provided in a vertical mode.
Figure 7C:
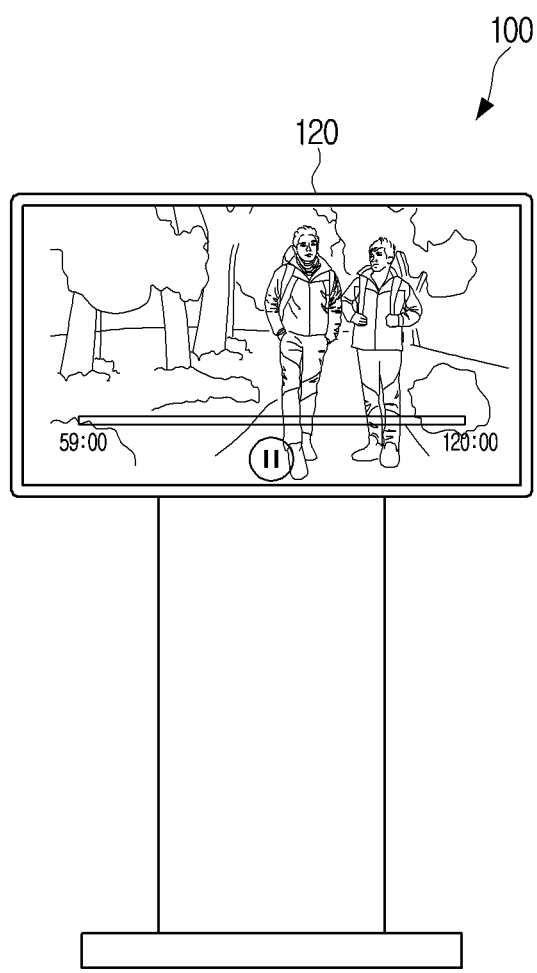
FIG. 7C is a view illustrating that a moving image application image installed in the external apparatus connectable to the electronic apparatus is provided in a horizontal mode.

FIGS. 7A to 7C are view for describing a method in which a display mode of the display is changed according to an image provided from the external apparatus, according to an embodiment.

When a user input for receiving an image provided through an external apparatus for which a display mode is set is received, the electronic apparatus 100 may control at least one of the display 120 or the motor 130 so that the display 120 is operated according to the display mode for the external apparatus. In addition, when an application which is installed in the external apparatus and for which a display mode is set is run, the electronic apparatus 100 may control at least one of the display 120 or the motor 130 so that the display 120 is operated according to the display mode for the corresponding application.

FIG. 7A is a view illustrating that an image provided in the electronic apparatus is provided in a horizontal mode. Referring to FIG. 7A, a screen provided in the electronic apparatus 100 is displayed. In addition, when a user input for receiving an image provided through an external apparatus such as a smartphone is received, the electronic apparatus 100 may control the display 120 to be operated according to a display mode set in the corresponding external apparatus as illustrated in FIG. 7B, and may display the image provided from a corresponding external apparatus on the display 120. As an example, when the display mode set in the external apparatus is a horizontal mode and the user input for receiving the image provided through the external apparatus is received, the electronic apparatus 100 may display the image provided from the external apparatus on the display 120 while controlling the display 120 to be operated in a vertical mode as illustrated in FIG. 7B.

In addition, when an application installed in the external apparatus is run while the image provided from the external apparatus is displayed as illustrated in FIG. 7B, the electronic apparatus 100 may control the display 120 to be operated according to a display mode set in the run application. As an example, when a display mode set in a moving image application installed in the external apparatus is a horizontal mode and a user input for receiving an image provided through the moving image application installed in the external apparatus is received, the electronic apparatus 100 may display the image provided from the moving image application installed in the external apparatus on the display 120 while controlling the display, which has been operated in the vertical mode, to be operated in the horizontal mode as illustrated in FIG. 7C.

Through the embodiment as described above, the display modes of the display may be set according to characteristics and types of applications installed in the external apparatus.

Figure 8A:
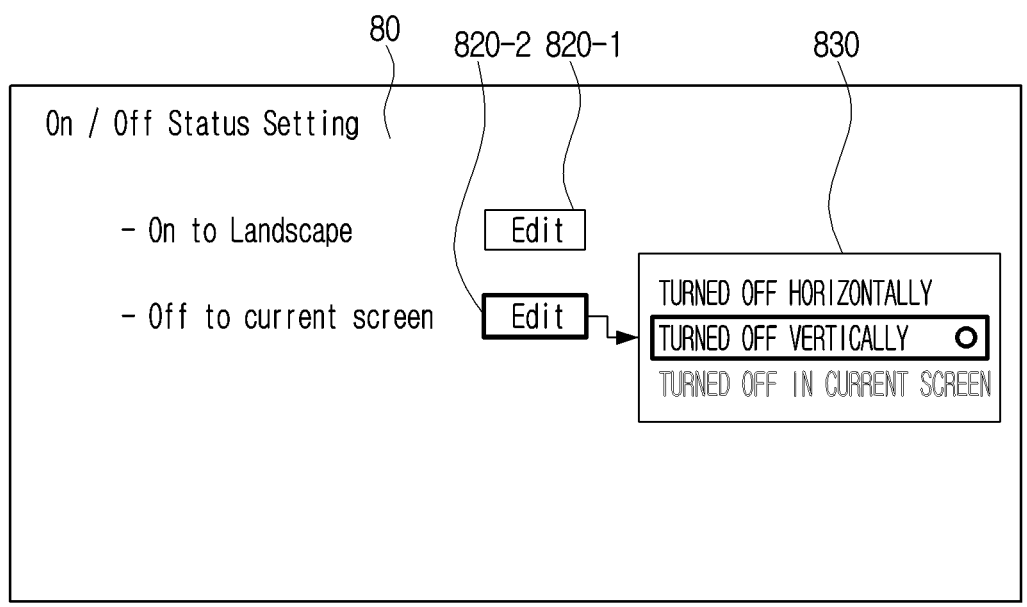

FIG. 8A is a view illustrating a UI for setting a display mode in a case where the electronic apparatus 100 according to an embodiment is turned off or turned on.

Referring to FIG. 8A, the electronic apparatus 100 may display a UI 80 for setting a display mode for each power status of the electronic apparatus 100 on the display. That is, the user may set a display mode of the display 120 in a case where the electronic apparatus 100 is turned on or turned off, through the UI 80 illustrated in FIG. 4.

In an embodiment, the UI 80 for setting the display mode for each power status of the electronic apparatus 100 may include an icon 820-1 for setting a display mode in a case where the electronic apparatus 100 is turned on and an icon 820-2 for setting a display mode in a case where the electronic apparatus 100 is turned off.

In addition, when the icon 820-2 for setting the display mode in the case where the electronic apparatus 100 is turned off is selected, the electronic apparatus 100 may further display an icon 830 for changing the display mode in the case where the electronic apparatus 100 is turned off, on the UI 80. In an embodiment, the icon 830 for changing the display mode in the case where the electronic apparatus 100 is turned off may include icons for 'turned off horizontally' and 'turned off vertically'. However, the icon 830 is not limited thereto, and may further include an icon for 'turned off in a current screen' as illustrated in FIG. 8A. That is, after the 'turned off horizontally' is selected in the icon 830, such that a display mode in the case where the electronic apparatus 100 is turned off is set to a horizontal mode, when a user input for turning off the electronic apparatus 100 is received, the electronic apparatus 100 may control at least one of the display 120 or the motor 130 so that the display 120 is operated in the horizontal mode and the electronic apparatus 100 is turned off That is, after the 'turned off in a current screen' is selected in the icon 830, such that a display mode in the case where the electronic apparatus 100 is turned off is set to a vertical mode, when a user input for turning off the electronic apparatus 100 is received, the electronic apparatus 100 may control the display 120 so that the display 120 is maintained in a current display mode and the electronic apparatus 100 is turned off.

In addition, when the icon 820-1 for setting the display mode in the case where the electronic apparatus 100 is turned on is selected, the electronic apparatus 100 may further display an icon for changing the display mode in the case where the electronic apparatus 100 is turned on, on the UI 80. In an embodiment, the icon for changing the display mode in the case where the electronic apparatus 100 is turned on may include icons for 'turned on horizontally' and 'turned on vertically'. However, this is not limiting, and an embodiment may further include an icon for 'turned on in a current screen'.

FIG. 8B is a view illustrating a method in which the display is operated according to a display mode in a case where the electronic apparatus 100 according to an embodiment is turned off and then turned on.

In an embodiment, a case where a display mode in the case where the electronic apparatus 100 is turned off is set to a 'vertical mode' and a display mode in the case where the electronic apparatus 100 is turned on is set to a 'horizontal mode' may be assumed. In this case, in a case where the display 120 is currently operated in the vertical mode as illustrated in FIG. 8B, when a user input for turning off the electronic apparatus 100 is received, the electronic apparatus 100 may control the display 120 so that the display mode of the display 120 is maintained as the vertical mode and the electronic apparatus 100 is turned off. In addition, when a user input for turning on the electronic apparatus 100 is received, the electronic apparatus 100 may control the display 120 and the motor 130 so that the display 120 is operated in the horizontal mode.

Figure 9:
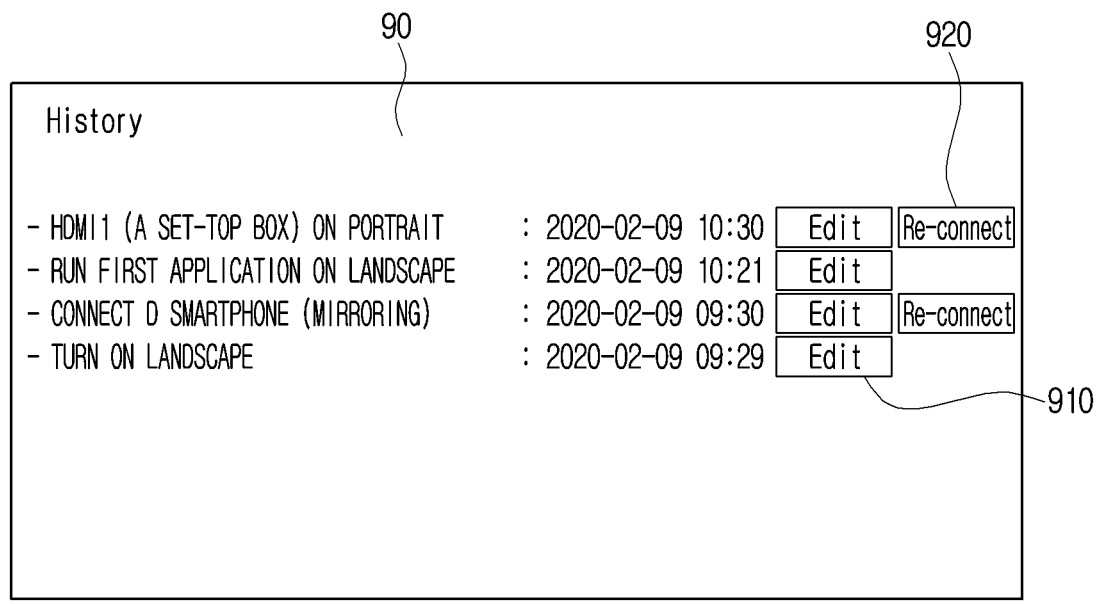
FIG. 9 is a view illustrating a UI for setting a display mode for each source according to a viewing history of the electronic apparatus according to an embodiment.

FIG. 9 is a view illustrating a UI for setting a display mode for each source according to a viewing history of the electronic apparatus 100 according to an embodiment.

Referring to FIG. 9, the electronic apparatus 100 may display history information on a source providing an image displayed on the display 120 on the UI 90 for setting the display mode for each source according to the viewing history. That is, referring to FIG. 9, it is illustrated that the electronic apparatus 100 has been turned on in the horizontal mode at 9:29 on Feb. 9, 2020, and the electronic apparatus 100 has been connected to a D smartphone in a mirroring manner after one minute. In addition, it is illustrated that a first application installed in the D smartphone has been executed in a horizontal mode at 10:21, and an image provided from an A set-top box connected to an HDMI No. 1 terminal has been run in a vertical mode at 10:30.

In addition, the electronic apparatus 100 may further display an icon for setting a display mode for each source according to the viewing history on the UI 90 for setting the display mode for each source according to the viewing history. That is, when an icon 910 corresponding to a case where the electronic apparatus 100 is turned on is selected, the electronic apparatus 100 may control the display 120 to display a UI for setting a display mode in the case where the electronic apparatus 100 is turned on.

In addition, when a 'Re-connect' icon 920 for a viewing history for the A set-top box is selected, the electronic apparatus 100 may control the display 120 to display the image provided through the A set-top box on the display 120

Through the embodiment described above, the display mode for each source providing the image may be set according to the image history displayed on the electronic apparatus 100.

Although in an embodiment described above the display mode for each source is set through the UI 90 for setting the display mode for each source according to the viewing history, an embodiment is not limited thereto. As an example, when a user input for setting a display mode for a first source to a horizontal mode is input a predetermined number of times or more (for example, five times), the electronic apparatus 100 may automatically set the display mode for the first source to the horizontal mode.

Figure 10A:
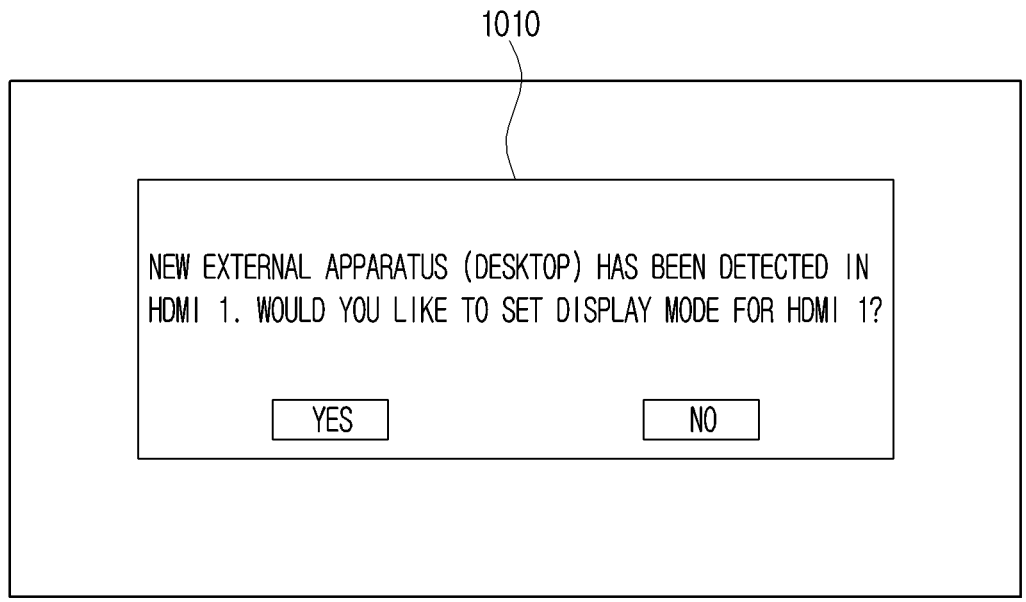
FIG. 10A is a view illustrating a UI for inquiring whether to or not set a display mode for an external apparatus connectable to the electronic apparatus according to an embodiment in a case where a first connection of the external apparatus to the electronic apparatus is performed.

FIG. 10A is a view illustrating a UI for inquiring whether to or not set a display mode for an external apparatus connectable to the electronic apparatus 100 according to an embodiment in a case where a first connection of the external apparatus to the electronic apparatus 100 is performed.

In an embodiment, when a desktop, which is a new external apparatus, is connected to a HDMI No. 1 terminal of the electronic apparatus 100, the electronic apparatus 100 may control the display 120 to display a UI 1010 for inquiring whether or not to set a display mode for the desktop. That is, the electronic apparatus 100 may display a UI for inquiring whether or not to set the display mode for the first connected external apparatus, to induce the user to set the display mode of the external apparatus when the electronic apparatus 100 and the external apparatus are first connected to each other.

Figure 10B:
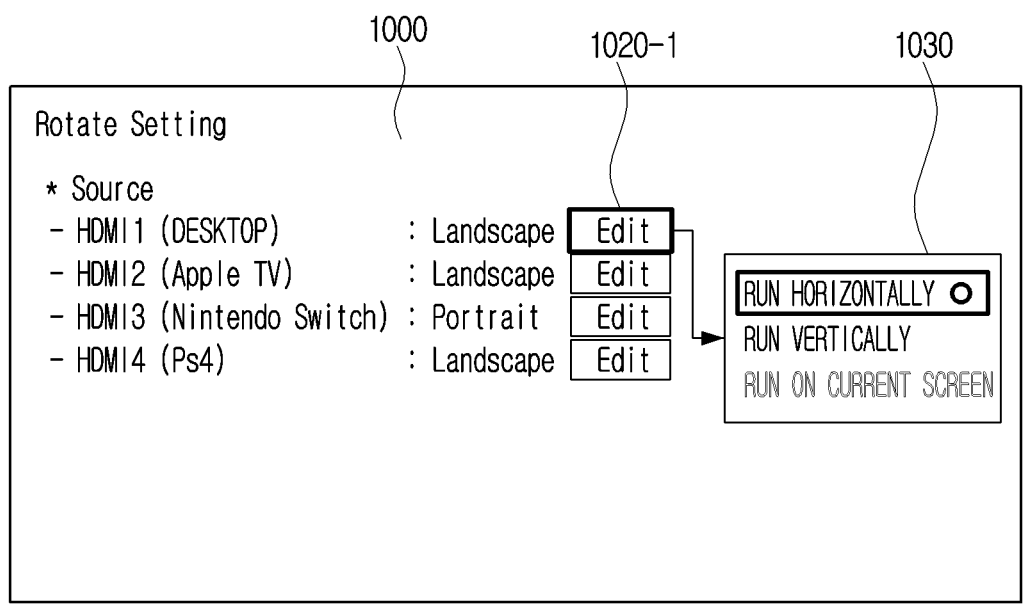
FIG. 10B is a view illustrating a UI for setting a display mode for the external apparatus whose the first connection to the electronic apparatus according to an embodiment is performed.

In addition, when it is identified that the display mode for the first connected external apparatus is set through the UI 1010, the electronic apparatus 100 may control the display 120 to display an UI 1000 for setting the display mode for the first connected external apparatus as illustrated in FIG. 10B. In an embodiment, the UI 1000 may include an icon 1020-1 for setting the display mode for the first connected desktop and an icon 1030 for changing the display mode for the desktop. In addition, the UI 1000 may further include information HDMI 1 on a terminal to which the first connected desktop is connected. In an embodiment, even though the desktop is first connected to the electronic apparatus 100, the display mode for the desktop may be set to a horizontal mode in advance. In addition, when the display mode for the desktop is changed through the icon 1030 for changing the display mode for the desktop, the electronic apparatus 100 may store the changed display mode as the display mode for the desktop.

Figure 11A:
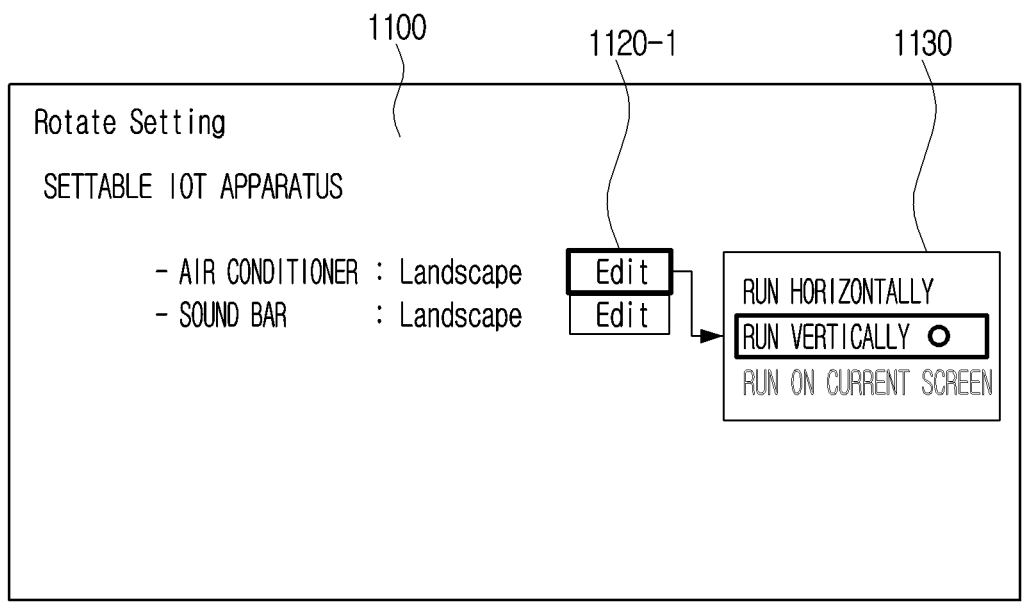
FIG. 11A is a view illustrating a UI for setting a display mode for a setting screen of the external apparatus connectable to the electronic apparatus according to an embodiment.
Figure 11B:
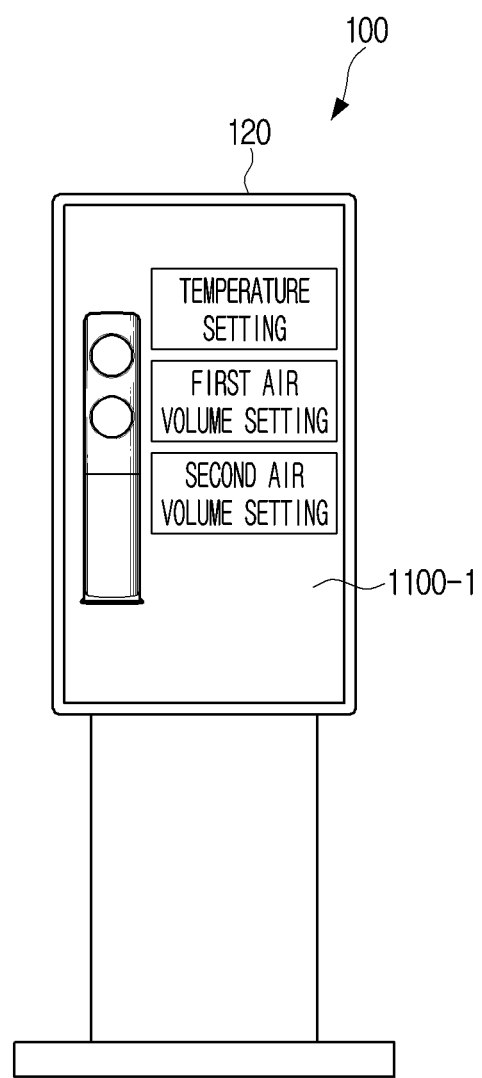
FIG. 11B is a view illustrating the setting screen of the external apparatus that is displayed according to the display mode for the setting screen of the external apparatus according to an embodiment.

FIG. 11A is a view illustrating a UI for setting a display mode for a setting screen of the external apparatus connectable to the electronic apparatus 100 according to an embodiment, and FIG. 11B is a view for describing a method in which the setting screen of the external apparatus is displayed according to the display mode for the setting screen of the external apparatus.

In an embodiment, in a case where the external apparatus connectable to the electronic apparatus 100 is an Internet of Things (IoT) apparatus that does not include a display, a setting screen for the external apparatus is displayed through the display of the electronic apparatus 100, such that a setting for the external apparatus may be performed.

In an embodiment, FIG. 11A illustrates a UI 1100 for changing a display mode for a setting screen of an air conditioner and a sound bar connectable to the electronic apparatus 100. When an icon 1120-1 for setting a display mode for a setting screen of the air conditioner is selected through the UI 1100, the electronic apparatus 100 may further display an icon 1130 for changing the display mode for the setting screen of the air conditioner, on the UI 1100. In an embodiment, in a case where the air conditioner connectable to the electronic apparatus 100 is a vertically long air conditioner, the user may set the display mode for the setting screen of the air conditioner to a vertical mode through the UI 1100. In addition, when a user input for displaying a setting screen of the vertically long air conditioner is received, the electronic apparatus 100 may control at least one of the display 120 or the motor 130 so that the display 120 is operated in the vertical mode as illustrated FIG. 11B and the setting screen 1100-1 of the air conditioner is displayed.

In addition, in an embodiment, in a case where the sound bar connectable to the electronic apparatus 100 is a horizontally long sound bar, the user may set the display mode for the setting screen of the sound bar to a horizontal mode through the UI 1100.

Through the embodiment described above, the setting screen for the external apparatus that does not include the display may be set according to a type of the external apparatus.

Figure 12A:
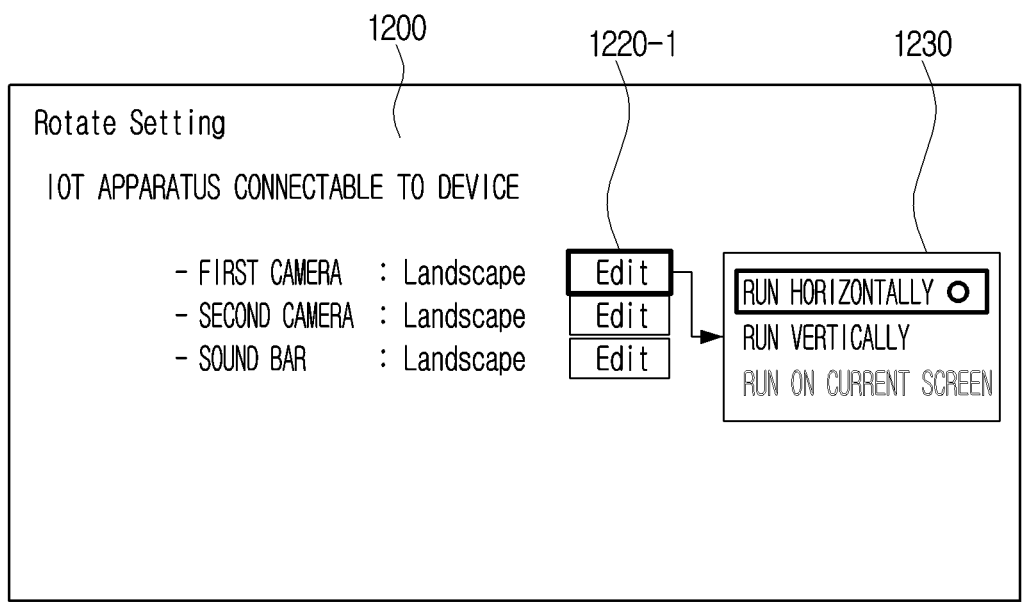
FIG. 12A is a view illustrating a UI for setting a display mode for a screen provided from the external apparatus connectable to the electronic apparatus according to an embodiment.
Figure 12B:
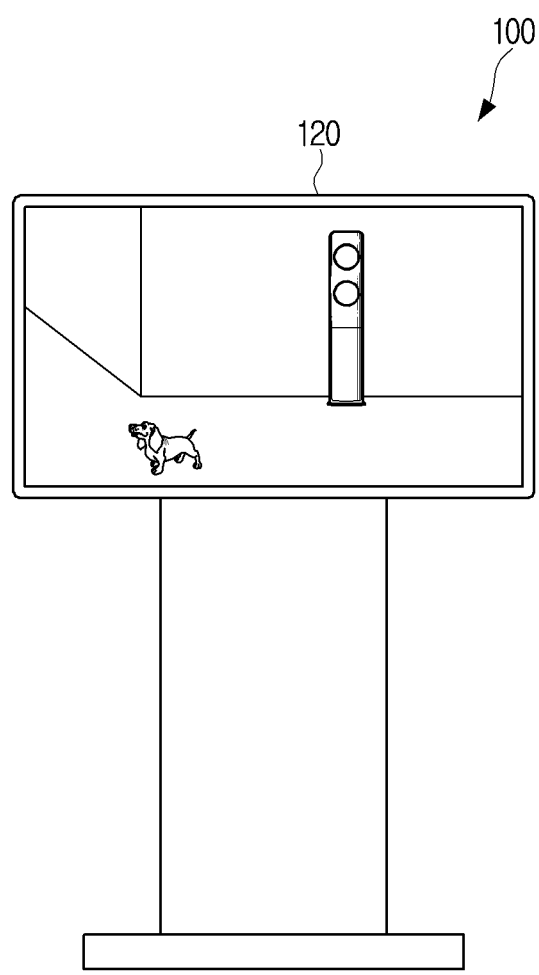
FIG. 12B is a view illustrating a camera screen provided according to a display mode of a screen provided from a camera connectable to the electronic apparatus according to an embodiment.

FIG. 12A is a view illustrating a UI for setting a display mode for a screen provided from the external apparatus connectable to the electronic apparatus 100 according to an embodiment, and FIG. 12B is a view for describing a method in which a camera screen is provided according to a display mode of a screen provided from a camera connectable to the electronic apparatus 100 according to an embodiment.

In an embodiment, in a case where the external apparatus connectable to the electronic apparatus 100 is an IoT apparatus, the electronic apparatus 100 may set a display mode for the IoT apparatus through an UI 1200 for setting a display mode of a screen provided from the IoT apparatus. In an embodiment, the electronic apparatus 100 may be connected to the IoT apparatus wirelessly. However, the electronic apparatus 100 is not limited thereto, and may also be connected to the IoT apparatus in a wired manner. A detailed content therefor will be described later with reference to FIG. 16.

In an embodiment, in a case where a first camera connectable to the electronic apparatus 100 is a camera for photographing an interior of a room in which the first camera is installed, a display mode for the first camera may be set through an icon 1220-1 for setting the display mode for the first camera and an icon 1230 for changing the display mode for the first camera, in the UI 1200. In addition, when a user input for displaying an image provided from the first camera is received, the electronic apparatus 100 may control at least one of the display 120 or the motor 130 so that the display 120 is operated according to the display mode for the first camera.

In an embodiment, in a case where the display mode for the first camera is set to a horizontal mode, when a user input for displaying the image provided from the first camera is received, the electronic apparatus 100 may control at least one of the display 120 or the motor 130 so that the display 120 is operated in the horizontal mode and the image provided from the first camera is displayed, as illustrated in FIG. 12B.

Figure 13:
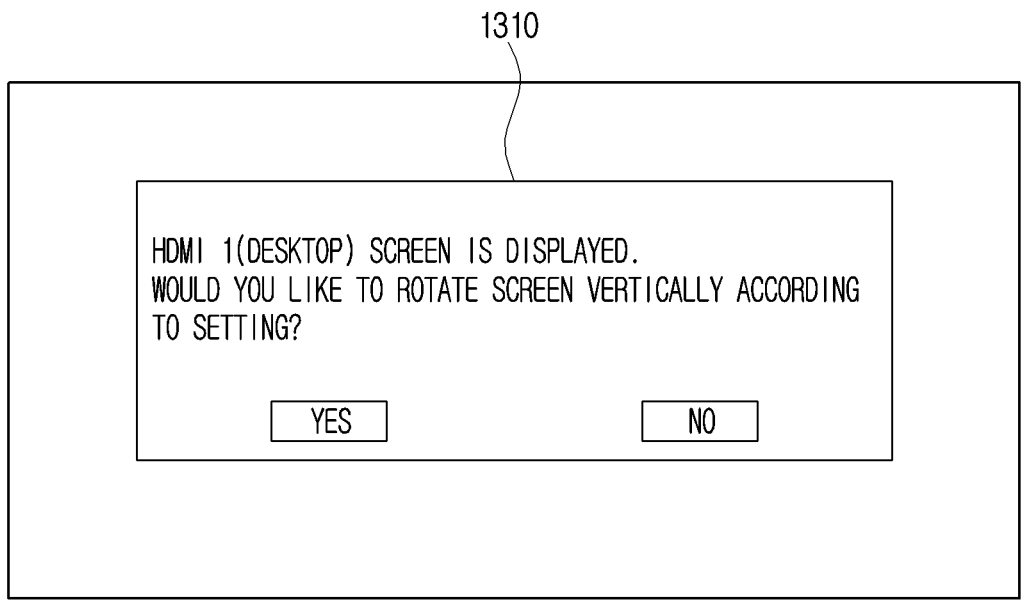
FIG. 13 is a view illustrating a UI inquiring whether or not to operate a display in a predetermined display mode according to an embodiment.

FIG. 13 is a view illustrating a UI inquiring whether or not to operate a display in a predetermined display mode according to an embodiment.

According to an embodiment, in a case where a user input for receiving an image provided through a source providing the image to the display 120 is received and a current display mode and a display mode corresponding to the source are not the same, the electronic apparatus 100 may control the display 120 to display a UI 1310 for inquiring whether or not to rotate the display 120.

That is, in a case where the user input for receiving the image provided through the source providing the image to the display 120 is received, the electronic apparatus 100 may control at least one of the display 120 or the motor 130 so that the display 120 is operated immediately according to a display mode corresponding to the source, but is not limited thereto. That is, in the case where the user input for receiving the image provided through the source providing the image to the display 120 is received, the electronic apparatus 100 may control at least one of the display 120 or the motor 130 so that the display 120 is operated according to the display mode corresponding to the source only in a case where a user input for rotating the display 120 is received through the UI 1310 of FIG. 13.

Figure 14:
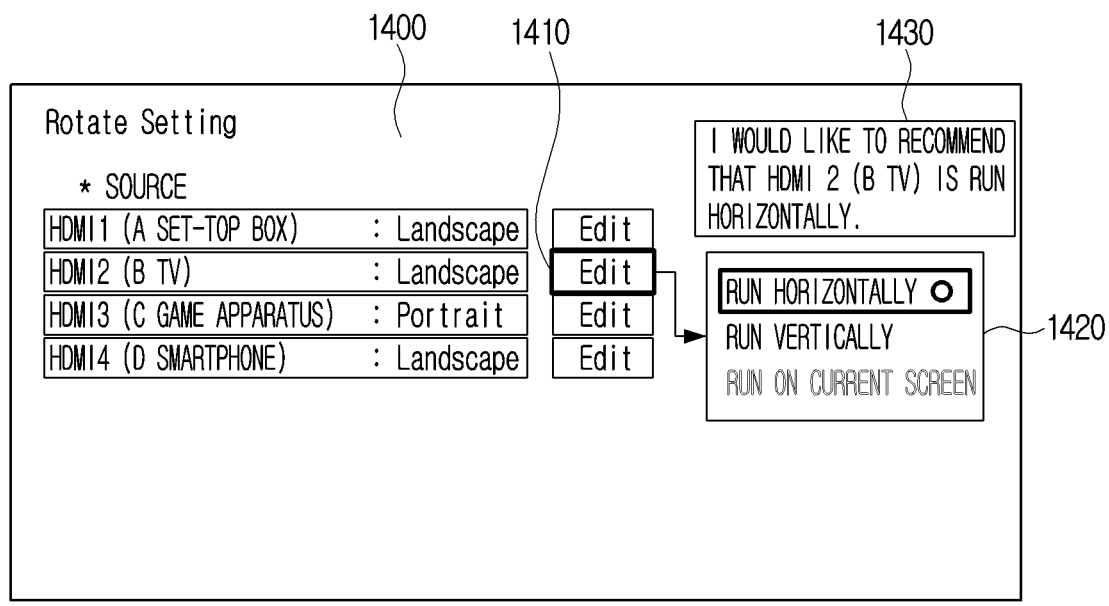
FIG. 14 is a view illustrating an icon for recommending a display mode for a source providing an image on the display according to an embodiment.

FIG. 14 is a view for describing an icon for recommending a display mode for a source providing an image on the display according to an embodiment.

In an embodiment, an icon 1430 for recommending a display mode for each source may be further displayed on a UI 1400 for setting a display mode for each of one or more sources providing images to the display 120. That is, when an icon 1410 for setting a display mode for a B TV connected to an HDMI No. 2 terminal is selected in the UI 1400 illustrated in FIG. 14, the electronic apparatus 100 may control the display 120 to further display an icon 1430 for recommending the display mode for the B TV together with an icon 1420 for changing the display mode for the B TV.

Specifically, the electronic apparatus 100 may obtain information on one or more sources providing images to the display 120 and control the display 120 to display an icon for recommending display modes corresponding to one or more sources on the basis of the acquired information. In an embodiment, the electronic apparatus 100 may obtain information on the B TV connected to the HDMI No. 2 terminal from the B TV. In an embodiment, the information on the B TV may include a type (TV), a product name, a manufacturer, content viewing history information, and the like, of the B TV. In an embodiment, when the type of the B TV in the information on the B TV is a TV, and the B TV has been viewed in a horizontal mode in the content viewing history information of the B TV, the electronic apparatus 100 may identify a recommendation display mode for the B TV as the horizontal mode. In addition, when the icon 1410 for setting the display mode for the B TV is selected, the electronic apparatus 100 may control the display 120 to display the icon 1430 for recommending the display mode for the B TV as the horizontal mode together with the icon 1420 for changing the display mode for the B TV.

Through the embodiment described above, the electronic apparatus 100 may provide a recommendation display mode for each characteristic of the sources providing the images to the display.

Figure 15:
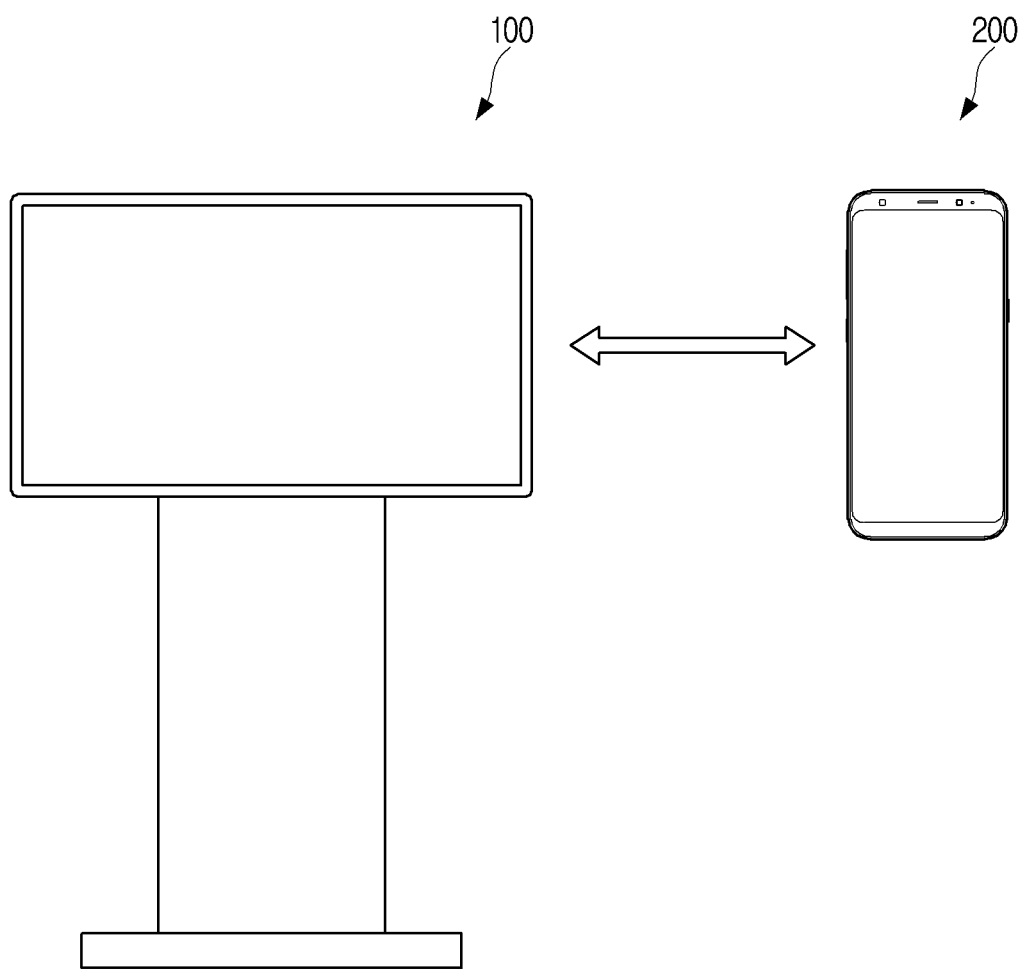
FIG. 15 is a view illustrating a method of setting display modes for one or more sources provided to the display of the electronic apparatus according to an embodiment.

FIG. 15 is a view for describing a method of setting display modes for one or more sources provided to the display 120 of the electronic apparatus 100 according to an embodiment in the external apparatus 200.

In an embodiment, display modes for one or more sources provided to the display 120 of the electronic apparatus 100 may also be set in the external apparatus 200 connectable to the electronic apparatus 100.

In an embodiment, in a case where the electronic apparatus 100 is connected to an external apparatus 200 such as a smartphone, a display mode for each source provided from the electronic apparatus 100 may be set through a display provided on the smartphone. In an embodiment, the display mode for each source provided from the electronic apparatus 100 may be set through an application for setting the display mode of the electronic apparatus 100 in the external apparatus 200. That is, a display mode in which an image provided from the external apparatus 200 is to be displayed on the display 120 of the electronic apparatus 100 may be set in the external apparatus 200, and a display mode for another external apparatus connectable to the electronic apparatus may be set in the external apparatus 200. In addition, in an embodiment, a display mode for each of applications installed in the electronic apparatus 100 may be set in the external apparatus 200.

Figure 16:
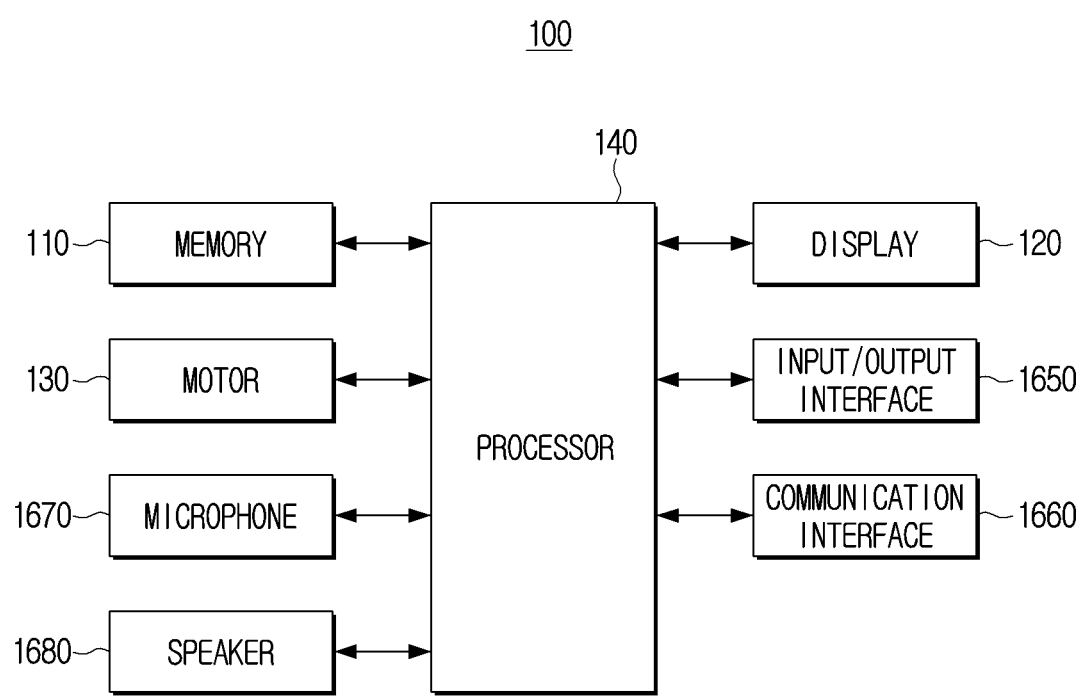
FIG. 16 is a block diagram illustrating a detailed configuration of an electronic apparatus according to an embodiment.

FIG. 16 is a block diagram illustrating a detailed configuration of an electronic apparatus according to an embodiment.

As illustrated in FIG. 16, the electronic apparatus 100 according to an embodiment may include a memory 110, a display 120, a motor 130, and a processor 140, and further include an input/output interface 1650, a communication interface 1660, a microphone 1670, and a speaker 1680. However, such components are only examples, and new components may be added to such components or some of such components may be omitted. Because the memory 110, the display 120, the motor 130, and the processor 140 are described above with reference to FIG. 1A, the input/output interface 1650, the communication interface 1660, the microphone 1670, the speaker 1680, and the like, will hereinafter be described in detail.

The input/output interface 1650 may input/output at least one of an audio signal or a video signal. Particularly, the input/output interface 1650 may receive an image input from an external apparatus capable of providing an image to the display 120.

The input/output interface 1650 may be any one of an HDMI, an MHL, a USB, a DP, a thunderbolt, a VGA port, an RGB port, a D-SUB, or a DVI. According to an implementation, the input/output interface 1650 may include a port inputting/outputting only an audio signal and a port inputting/outputting only a video signal as separate ports, or may be implemented by a single port inputting/outputting both of an audio signal and a video signal.

The communication interface 1660 is a component performing communication with various types of external apparatuses depending on various types of communication manners. The communication interface 1660 may include a wireless fidelity (Wi-Fi) chip, a Bluetooth chip, a wireless communication chip, and a near field communication (NFC) chip. The processor 140 may perform communication with various external apparatuses using the communication interface 1660.

In an embodiment, the processor 140 may perform a connection to an IoT apparatus connectable to the electronic apparatus 100 in a wireless manner through a communication interface 1660. Particularly, the Wi-Fi chip and the Bluetooth chip may perform communication in a Wi-Fi manner and a Bluetooth manner, respectively. In the case of using the Wi-Fi chip or the Bluetooth chip, various connection information such as a service set identifier (SSID), a session key, and the like, is first transmitted and received, communication is connected using the connection information, and various information may then be transmitted and received. The wireless communication chip refers to a chip performing communication depending on various communication protocols such as Institute of Electrical and Electronics Engineers (IEEE), Zigbee, 3rd generation (3G), 3rd generation partnership project (3GPP), long term evolution (LTE), and the like. The NFC chip refers to a chip operated in an NFC manner using a band of 13.56 MHz among various radio frequency identification (RFID) frequency bands such as 135 kHz, 13.56 MHz, 433 MHz, 860 to 960 MHz, 2.45 GHz, and the like.

That is, in an embodiment, the processor 140 performs a connection with the external apparatus providing the image to the display 120 through the input/output interface 1650 or the communication interface 1660, such that the image provided from the external apparatus may be displayed on the display 120.

The microphone 1670 receives an audio signal from the outside. The audio signal may include a user voice, and the user voice may include an instruction for setting a display mode for a source providing an image to the display 120 of the electronic apparatus 100. However, the user voice is not limited thereto, and may include various voice instructions for controlling the electronic apparatus 100.

In an embodiment, when a user voice for setting the display mode for the source providing the image to the display 120 is input from the microphone 1670, the processor 140 may set the display mode for the source on the basis of the input user voice. That is, the user input according to an embodiment may be input from the microphone 1670 through the user voice. Specifically, the processor 140 may receive the user voice through the microphone 1670 and perform voice recognition on the received user voice to obtain a user command corresponding to the received user voice. More specifically, the processor 140 may receive the user voice through the microphone 1670 and input the received user voice to a learned artificial intelligence model to obtain a user command corresponding to the received user voice. In addition, when the user command corresponding to the received user voice is obtained, the processor 140 may set the display mode for the source providing the image to the display 120 on the basis of a type of the user command, as described above. That is, the display mode for the source has been set by selecting the icon on the UI for setting the display mode in the embodiment described above with reference to the drawings, but embodiments are not limited thereto, and the display mode for the source providing the image to the display 120 may be set through the user voice.

Although FIG. 16 illustrates that the electronic apparatus 100 includes the microphone 1670, embodiments are not limited thereto, and an external electronic apparatus may receive an audio signal and the electronic apparatus 100 according to embodiments may receive the audio signal from the external electronic apparatus.

The speaker 1680 may output audio data under the control of the processor 140. Particularly, in embodiments, the speaker 1680 may output a voice content provided according to a user command. In addition, in an embodiment, in a case where the display 120 is rotated, the speaker 1680 may output an audio for informing the user that the display is rotated.

As described above, the UI for setting the display mode for the source providing the image to the display 120 according to embodiments is displayed on the display 120 in the display mode of the horizontal mode, but the UI is not limited thereto. That is, the UIs according to an embodiment may be displayed on the display 120 in the display mode of the vertical mode.

Terms used herein are used only to describe certain embodiments rather than limiting the scope of embodiments. Singular forms are intended to include plural forms unless the context clearly indicates otherwise.

In embodiments, an expression "have", "may have", "include", or "may include" indicates existence of a corresponding feature (for example, a numerical value, a function, an operation, or a component such as a part), and does not exclude existence of an additional feature.

In embodiments, an expression "A or B", "at least one of A and/or B", or "one or more of A and/or B", may include all possible combinations of items enumerated together. For example, "A or B", "at least one of A and B", or "at least one of A or B" may indicate all of 1) a case where at least one A is included, 2) a case where at least one B is included, or 3) a case where both of at least one A and at least one B are included.

Expressions "first" or "second" used herein may indicate various components regardless of a sequence and/or importance of the components, will be used only to distinguish one component from the other components, and do not limit the corresponding components.

When it is mentioned that any component (for example, a first component) is (operatively or communicatively) coupled to or is connected to another component (for example, a second component), it is to be understood that any component is directly coupled to another component or may be coupled to another component through the other component (for example, a third component).

On the other hand, when it is mentioned that any component (for example, a first component) is "directly coupled" or "directly connected" to another component (for example, a second component), it is to be understood that the other component (for example, a third component) is not present between any component and another component.

An expression "configured (or set) to" used herein may be replaced by an expression "suitable for", "having the capacity to" "designed to", "adapted to", "made to", or "capable of" depending on a situation. A term "configured (or set) to" may not necessarily mean "specifically designed to" in hardware.

Instead, in some situations, an expression "apparatus configured to" may mean that the apparatus may "do" together with other apparatuses or components. For example, a phrase "processor configured (or set) to perform A, B, and C" may mean a dedicated processor (for example, an embedded processor) for performing the corresponding operations or a generic-purpose processor (for example, a CPU or an application processor) that may perform the corresponding operations by executing one or more software programs stored in a memory device.

In embodiments, a 'module' or a '~er/or' may perform at least one function or operation, and be implemented by hardware or software or be implemented by a combination of hardware and software. In addition, a plurality of 'modules' or a plurality of '~ers/ors' may be integrated in at least one module and be implemented by at least one processor except for a 'module' or an '~er/or' that needs to be implemented by specific hardware.

Meanwhile, various elements and regions in the drawings are schematically illustrated. Therefore, the spirit of embodiments is not limited by relative sizes or intervals illustrated in the accompanying drawings.

Embodiments described above may be implemented in a computer or a computer-readable recording medium using software, hardware, or a combination of software and hardware. According to a hardware implementation, embodiments may be implemented using at least one of ASICs, DSPs, digital signal processing devices (DSPDs), programmable logic devices (PLDs), field programmable gate arrays (FPGAs), processors, controllers, micro-controllers, micro-processors, or electric units for performing other functions. In some cases, embodiments described in the specification may be implemented by the processor itself. According to a software implementation, embodiments such as procedures and functions described in the specification may be implemented by separate software modules. Each of the software modules may perform one or more functions and operations described in the specification.

The methods according to embodiments may be performed by executing the software containing one or more instructions that are stored in a non-transitory readable medium. The non-transitory readable medium may be mounted and used in various apparatuses.

The non-transitory computer-readable medium is not a medium that stores data for a while, such as a register, a cache, a memory, or the like, but means a medium that semi-permanently stores data and is readable by an apparatus. In detail, programs for performing the diverse methods described above may be stored and provided in the non-transitory readable medium such as a CD, a digital versatile disc (DVD), a hard disc, a Blu-ray disc, a USB, a memory card, a ROM, or the like.

According to an embodiment, the methods may be included and provided in a computer program product. The computer program product may be traded as a product between a seller and a purchaser. The computer program product may be distributed in a form of a storage medium (for example, a CD-ROM) that may be read by the machine or online through an application store (for example, Play-Store™). In a case of the online distribution, at least portions of the computer program product may be at least temporarily stored in a storage medium such as a memory of a server of a manufacturer, a server of an application store, or a relay server or be temporarily created.

While embodiments have been particularly shown and described with reference to the drawings, the embodiments are provided for the purposes of illustration and it will be understood by one of ordinary skill in the art that various modifications and equivalent other embodiments may be made from the disclosure. Accordingly, the true technical scope of the disclosure is defined by the technical spirit of the appended claims.

What is claimed is:

1. An electronic apparatus comprising:
a display configured to be rotatable;
a motor configured to rotate the display;
a first external interface configured to receive a first image signal input from a first external device connected to the electronic apparatus;
a second external interface configured to receive a second image signal input from a second external device connected to the electronic apparatus;
a memory configured to store at least one instruction; and
a processor configured to execute the at least one instruction to:
control the display to display a first user interface (UI) for changing a display mode corresponding to the first external interface and the second external interface,
based on receiving, through the first UI, a first user input for selecting the first external interface and receiving a second user input for selecting a first display mode among a horizontal mode and a vertical mode, store information on the first display mode corresponding to the first external interface in the memory,
based on receiving, through the first UI, a third user input for selecting the second external interface and receiving a fourth user input for selecting a second display mode among the horizontal mode and the vertical mode, store information on the second display mode corresponding to the second external interface in the memory, and
control at least one of the display or the motor so that the display is operated in one of the horizontal mode or the vertical mode according to the information on the display mode corresponding to the first external interface and the second external interface that is stored in the memory, based on receiving a fifth user input for providing an image through the first external interface or the second external interface.

2. The electronic apparatus as claimed in claim 1, wherein the processor is further configured to control the display to display the first UI, based on a first connection to the first external device being performed.

3. The electronic apparatus as claimed in claim 2, wherein the processor is further configured to:
control the display to further display information on a first terminal connecting the first external device and the electronic apparatus and a second terminal connecting the second external device and the electronic apparatus, and
display information on the first external device and the second external device on the first UI, based on the first connection to the first external device and a second connection to the second external device being performed.

4. The electronic apparatus as claimed in claim 1, wherein the processor is further configured to:
obtain information on the first external device connected to the electronic apparatus and the second external device connected to the electronic apparatus, and
control the display to further display a recommendation icon for recommending the display mode corresponding to the first external device connected to the electronic apparatus and the second external device connected to the electronic apparatus, based on the obtained information.

5. The electronic apparatus as claimed in claim 1, wherein the first UI displays information on one or more external devices connected to the electronic apparatus and displays one or more first icons for setting the display mode and one or more second icons for setting the display mode for each of the one or more external devices connected to the electronic apparatus, and
the processor is further configured to:
control the display to display the first UI, based on a first icon corresponding to the first external device connected to the electronic apparatus and a second icon corresponding the second external device connected to the electronic apparatus among the one or more first icons and the one or more second icons being selected, and
based on a sixth user input for changing the display mode corresponding to the first external device and the second external device connected to the electronic apparatus being received through the first UI, store the information on the changed display mode corresponding to the first external device and the second external device in the memory.

6. The electronic apparatus as claimed in claim 1, wherein the processor is further configured to:

control the display to further display a second UI for setting a display mode for each of one or more applications that are installed in the first external device and one or more applications that are installed in the second external device, and store information on a display mode corresponding to a first application and a second application in the memory, based on a sixth user input for setting the display mode corresponding to the first application and the second application of the one or more applications installed in the first external device being received through the third UI.

7. The electronic apparatus as claimed in claim 6, wherein the processor is further configured to control the at least one of the display or the motor so that the display is operated according to the information on the display mode corresponding to the first application and the second application that is stored in the memory, based on a seventh user input for displaying the first application being received while an image is provided from the first external device and eighth user input for displaying the second application being received while an image is provided from the second external device.

8. The electronic apparatus as claimed in claim 1, wherein the processor is further configured to:

identify whether the display mode corresponding to the first external interface and a current display mode are the same, based on the fifth user input for providing the image through the first being received, control the motor to rotate the display, based on the display mode corresponding to the first external interface and the current display mode not being the same, and control the motor to not rotate the display, based on the display mode corresponding to the first external interface and the current display mode being the same, and wherein the current display mode is the one of the horizontal mode or the vertical mode.

9. The electronic apparatus as claimed in claim 8, wherein the processor is further configured to:

control the display to display a third UI for inquiring whether to rotate the display, based on the display mode corresponding to the first external interface and the current display mode not being the same, and control the motor to rotate the display, based on a user input for rotating the display being received through the third UI.

10. The electronic apparatus as claimed in claim 1, wherein the processor is further configured to:

control the display to display information on one or more external devices displayed on a screen of the display, information on display modes in which the one or more external devices are displayed, and an icon for setting the display mode for each of the one or more external devices displayed on the screen, and control the display to display the second UI, based on the icon being selected.

11. A control method of an electronic apparatus, the control method comprising:

displaying, on a display of the electronic apparatus, a first user interface (UI) for changing a display mode corresponding to a first external interface and a second external interface, the first external interface being configured to receive a first image signal input from a first external device connected to the electronic apparatus, and the second external interface being configured to receive a second image signal input from a second external device connected to the electronic apparatus;

based on receiving, through the first UI, a first user input for selecting athe first external interface and receiving a second user input for selecting a first display mode among a horizontal mode and a vertical mode, storing information on the first display mode corresponding to the first external interface;

based on receiving, through the first UI, a third user input for selecting the second external interface and receiving a fourth user input for selecting a second display mode among the horizontal mode and the vertical mode, storing information on the second display mode corresponding to the second external interface;

based on the first external device being connected through the first external interface to the electronic apparatus, identifying whether a current display mode is different from the selected display mode corresponding to the first external interface; and based on the current display mode being different from the selected display mode corresponding to the first external interface, controlling the display and a motor configured to rotate the display of the electronic apparatus so that the display is operated in one of the horizontal mode or the vertical mode according to the stored information on the selected display mode corresponding to the first external interface.

12. The control method as claimed in claim 11, wherein the displaying the first UI further comprises displaying the first UI, based on a first connection to the first external device being performed.

13. The control method as claimed in claim 12, wherein the displaying the first UI further comprises displaying information on a first terminal connecting the first external device and the electronic apparatus and a second terminal connecting the second external device and the electronic apparatus; and displaying information on the first external device and the second external device on the first UI, based on the first connection to the first external device and a second connection to the second external device being performed.

14. The control method as claimed in claim 12, wherein the controlling further comprises:

controlling the at least one of the display or the motor so that the display is operated according to the stored information on the selected display mode corresponding to the first external interface and the second external interface based on a fifth user input for displaying the first external device or the second external device being received while an image is provided from the first external device or the second external device.

15. The control method as claimed in claim 11, wherein the displaying the second UI further comprises:

obtaining information on the first external device connected to the electronic apparatus and the second external device connected to the electronic apparatus; and displaying a recommendation icon for recommending the display mode corresponding to the first external device connected to the electronic apparatus and the second external device connected to the electronic apparatus, based on the obtained information.

16. The control method as claimed in claim 11, wherein the first UI displays information on a plurality of external devices connected to the electronic apparatus and displays one or more first icons corresponding to the first external device connected to the electronic apparatus and one or more second icons corresponding to the second external device connected to the electronic apparatus, and wherein the displaying the first UI further comprises displaying the firstUI, based on a first icon corresponding to the first external device among the one or more first icons being selected and a second icon corresponding to the second external device among the one or more second icons being selected.

17. The control method as claimed in claim 11, wherein the controlling further comprises:

controlling the motor so that the display is not rotated, based on the selected display mode corresponding to the first external interface and the current display mode being the same, wherein the current display mode is the one of the horizontal mode or the vertical mode.

18. The control method as claimed in claim 17, wherein the controlling further comprises:

displaying a second UI for inquiring whether to rotate the display, based on the selected display mode corresponding to the first external interface and the current display mode not being the same, and controlling the motor to rotate the display, based on a user input for rotating the display being received through the second UI.

19. The control method as claimed in claim 11, wherein the displaying the first UI further comprises:

displaying information on a plurality of external devices displayed on a screen of the display, information on display modes in which the plurality of external devices are displayed, and an icon for setting the display mode for each of the plurality of external devices displayed on the screen, and displaying the first UI, based on the icon being selected.

\* \* \* \* \*